United States Patent [19]

Kobayashi et al.

[11] Patent Number: 5,465,244

[45] Date of Patent: Nov. 7, 1995

[54] DISC REPRODUCING APPARATUS

[75] Inventors: Akira Kobayashi; Takuji Yoshida; Hisahide Hattori, all of Kanagawa; Toshiya Takabayashi, Saitama, all of Japan

[73] Assignee: Kabushiki Kaisha Toshiba, Kawasaki, Japan

[21] Appl. No.: 236,168

[22] Filed: May 2, 1994

Related U.S. Application Data

[63] Continuation of Ser. No. 858,160, Mar. 27, 1992, abandoned.

[30] Foreign Application Priority Data

Mar. 28, 1991 [JP] Japan .................................. 3-090073

[51] Int. Cl.⁶ ..................................................... G11B 5/09
[52] U.S. Cl. ............................................. 369/50; 369/33
[58] Field of Search ............................. 369/112, 32, 33, 369/34, 35, 13, 43, 30, 53, 47, 48, 50, 54; 360/77.02

[56] References Cited

U.S. PATENT DOCUMENTS

| | | | |
|---|---|---|---|
| 4,094,010 | 6/1978 | Pepperl et al. | 369/44.26 |
| 4,094,013 | 6/1978 | Hill et al. | 369/44.26 |
| 4,460,988 | 7/1984 | Gordon | 369/32 |
| 4,644,515 | 2/1987 | Allebest et al. | 369/34 |
| 4,821,125 | 4/1989 | Christensen et al. | 369/53 |
| 4,845,696 | 7/1989 | Ohtsuki et al. | 369/13 |
| 4,873,679 | 10/1989 | Murai et al. | 369/32 |
| 4,998,238 | 3/1991 | Mizunoe et al. | 369/33 |
| 5,003,524 | 3/1991 | Ikeda | 369/44.28 |
| 5,163,162 | 11/1992 | Berry et al. | 360/77.02 |

FOREIGN PATENT DOCUMENTS

| | | | |
|---|---|---|---|
| 2229101 | 12/1974 | France. | |
| 60-50767 | 3/1985 | Japan. | |
| 02236840 | 9/1990 | Japan | 369/112 |

OTHER PUBLICATIONS

Patent Abstracts of Japan, Optical Multichannel Recording Method, Oct. 27, 1977, vol. 2, No. 11.
Patent Abstracts of Japan, Optical Data Reading System, Jul. 13, 1985, vol. 9, No. 296.

*Primary Examiner*—Scott J. Sugarman
*Assistant Examiner*—P. W. Huber
*Attorney, Agent, or Firm*—Cushman Darby & Cushman

[57] ABSTRACT

A disc reproducing aparatus is provided which is able to read out all of the data stored on the disc in a short time. The disk reproducing apparatus reproduces data stored on a disc and comprise a device for rotating the disc and a data processing device having a plurality of optical pickup devices for reading the data from the rotating disc, such that each pickup device reads a different part of the data area.

8 Claims, 14 Drawing Sheets

DISC REPRODUCING APPARATUS

This is a continuation of application Ser. No. 07/858,160, filed on Mar. 27, 1992, which was abandoned upon the filing hereof.

BACKGROUND OF THE INVENTION

1. Field of the Invention

The present invention relates to a disc reproducing apparatus which is useful for reproducing data stored on a disc. More specifically, the invention relates to a disc reproducing apparatus which is able to read out the data stored on the disc in a short time.

2. Description of the Related Art

In the field of sound apparatus, much interest exist in the sound apparatus for reproducing a digital audio signal stored on an optical disc wherein the digital audio signal is obtained by PCM(Pulse Code Modulation) which is a kind of A/D conversion.

A CD(Compact Disc) system is a kind of sound apparatus for reproducing or recording a digital audio signal on the optical disc. The diameter of the CD is 12 centimeters. Apparatus for reproducing the digital audio signal in the CD system consist of an optical pickup device to read out the data.

A CD system is essentially the sound apparatus for reproducing or recording a digital audio signal. But, the use of the CD system is not only for sound apparatus, but also as a data reproducing apparatus for reproducing computer data. The CD is a storage medium which has high storage density. Therefore, a CD-ROM system has been developed wherein the computer data is stored on the storage area of the CD.

The storage format of the CD-ROM system is the same as the Storage format of the CD system. Each disc stores a stereo audio signal comprised of two 16 bit data words sampled at 44.1 kHz in the CD system.

In the CD-ROM system, the minimum data block stored on the disc is an 8 bit (1 byte) data word which is obtained by dividing a 16 bit data word in two. A one sector data word is composed of 2352 byte data words.

The one sector data word is composed of:

(1) a 12 byte data word which is synchronous data for identification of the sector;

(2) a 4 byte data word which is header data of the sector corresponding to the subcode Q data in the CD system;

(3) 2048 byte data words which are user data; and (4) 288 byte data words which are used for detection and correction of the data error of (1) and (2) in mode 1 in the CD-ROM system, or for user data.

The storage format mode 1 is used for restoring or reproducing sound data. The data error correction ratio in mode 1 is $10^{-12}$. The data error correction ratio in mode 2 is $10^{-9}$ but the 288 byte data words are able to be used as user data. Accordingly the total user data in the mode 2 is 2336(2048+288) byte data words.

The 1 sector corresponds to a frame of data of subcode. The reproducing apparatus reproduces the data of the sector at 1/75 sec. The data transference rate is 2K×75=150 Kbytes/sec in the mode 1, so one sector is 2 Kbytes(2048 bytes). Accordingly the total data stored on a side of the disc which stores one hour of the audio data is 150×75×60=540 Mbytes. The CD-ROM disc is the recording medium which has a large data capacity and a low reproduction error ratio. The disc is able to store the computer data with the audio data. The computer data is distinguished from the audio data by inspecting the subcode Q data.

The CD-ROM disc is only a recording medium, the CD-ROM system needs the host (computer) system. The CD-ROM system is controlled by the host (computer) system. When the host (computer) system transfers a command for accessing the data to the CD-ROM system, the CD-ROM system searches for the data accessed by the host (computer) system. After searching for the data, the CD-ROM system transfers the data located to the host (computer) system and the host (computer) system processes the data translated.

The data transference speed of the host computer depends on performance of the CPU (Central Processing Unit) of the host computer or application software program stored in the host computer. Therfore, the data transference speed of the host computer is different from the data transference speed (150 kbyte/sec) of the CD-ROM disc reproducing apparatus. The data transference speed of the host computer is not syncronized with the data transference speed of the CD-ROM disc reproducing apparatus. The CD-ROM disc reproducing apparatus has a buffer memory for absorbing the difference of speed between the data transference speed of the host computer and the data transference speed of the CD-ROM disc reproducing apparatus.

The process of the data transference from the CD-ROM disc reproducing apparatus to the host computer is represented as follows.

(1) The address data corresponding to objective data stored on the disc transfers from the host computer to the CD-ROM disc reproducing apparatus.

(2) The CD-ROM disc reproducing apparatus moves the optical pickup device to the address of the objective data stored on the disc.

(3) After moving the optical pickup device to the address of the objective data, the objective data is read out and written in the buffer memory in the CD-ROM disc reproducing apparatus.

(4) After writing the objective data, the CD-ROM disc reproducing apparatus transfers the objective data to the host computer at a constant velocity.

The CD-ROM disc reproducing apparatus repeats the process of steps (2) and (3), and completes the transference of all the objective data.

The CD-ROM system has a large data capacity and the storing density of the data is high. However, the time for reading out the data is long in spite of the CD-ROM system being a random data accessing system, so the disc revolution speed changes at the range of 500~200 rpm. The cause of the long read out time is changing of the disc revolution and the spiral data recording form on the disc.

For example, the read out time is 1 hour(3600 sec) when the CD-ROM disc reproducing apparatus reads out all of the data stored on the disc at 150 Kbyte/sec wherein the disc has 12 centimeter diameter and stores 540 MByte data word. In the case of reproducing audio data, it is no problem, but in the case of displaying the picture obtained by reproducing the data on the disk, laying device of the host computer and requiring display of a large amount of data, it is inconvenient that the CD-ROM disc reproducing apparatus reads out large numbers of the data required at every access requirement from the host computer.

There are two data accessing methods.

(a) The position of the optical pickup device is nearby the position of the data required when the host computer transfers the command for accessing the data.

(b) The position of the optical pickup device is far from the position of the data required when the host computer transfers the command for accessing the data.

In the case of (a), the disc reproducing apparatus is able to read the data required by kicking the lens of the pickup device in the tracking direction.

In the case of (b), for reading out the data required, the disc reproducing apparatus must move the pickup device at first and then move the lens of the pickup device to the position of the data required. In the case when the position of the optical pickup device is far from the position of the data required, the read out time of the data becomes long, because the disc reproducing apparatus must perform the two steps.

The lens of the pickup device is designed to be able to move plus/minus 400 µm in the radius directions of the disc. If the distance between each track of the data stored on the disc is 1.6 µm, it is possible to read out plus/minus 250 tracks of the data stored on the disc by moving the lens without moving the pickup device. The program area of the disc has 20625 tracks of data.

The case wherein present position of the pickup device is within plus/minus 250 tracks from the position of the data required corresponds to the case of (a). The case wherein present position of the pickup device is outside of plus/minus 250 tracks from the position of the data required corresponds to the case of (b). In this case, it is nessesary to move the pickup device and the lens to access the data.

The CD-ROM disc stores the data in constant linear velocity form for high storing density of the data. Reading out the data stored in constant linear velocity form needs complex controlling of the disc motor driving. The controlling block for driving the disc mortor is mainly composed of AFC (Auto Frequency Control) block and APC (Auto phase Control) block. A frequency control signal is generated by comparing the frequency of the frame syncronizing signal and the frequency of the clock pulse(2.1168 MHz) for detecting the frequency of the signal in the AFC block. A phase control signal is generated by comparing the phase of the frame syncronizing signal divided and the phase of a standard frequency signal in the APC block. CLV (Constant Linear Velocity) control is operated by the frequency control signal and the phase control signal.

A conventional disc reproducing apparatus which reproduces the data stored on the CD-ROM disc requires a long time to read out all of the data stored on the disc.

SUMMARY OF THE INVENTION

Accordingly, it is an object of present invention to provide a disc reproducing apparatus for reproducing the data stored on a disc.

It is further object of the present invention to provide a disc reproducing apparatus which is able to read out all of the data stored on the disc in a short time.

These objects, among the others, are achieved by providing an apparatus for reproducing data stored on a disc, comprising:

rotating means for rotating the disc; and data processing means having a plurality of optical pickup devices for reading the data from the rotating disc, wherein each pickup device reads a different part of the data area.

BRIEF DESCRIPTION OF THE DRAWINGS

A more complete appreciation of the invention and many of its attendant advantages will be readily obtained by reference to the following detailed description considered in connection with the accompanying drawings, in which.

DESCRIPTION OF THE PREFERRED EMBODIMENT

The following description explains one of the examples of this invention.

Figure 1:
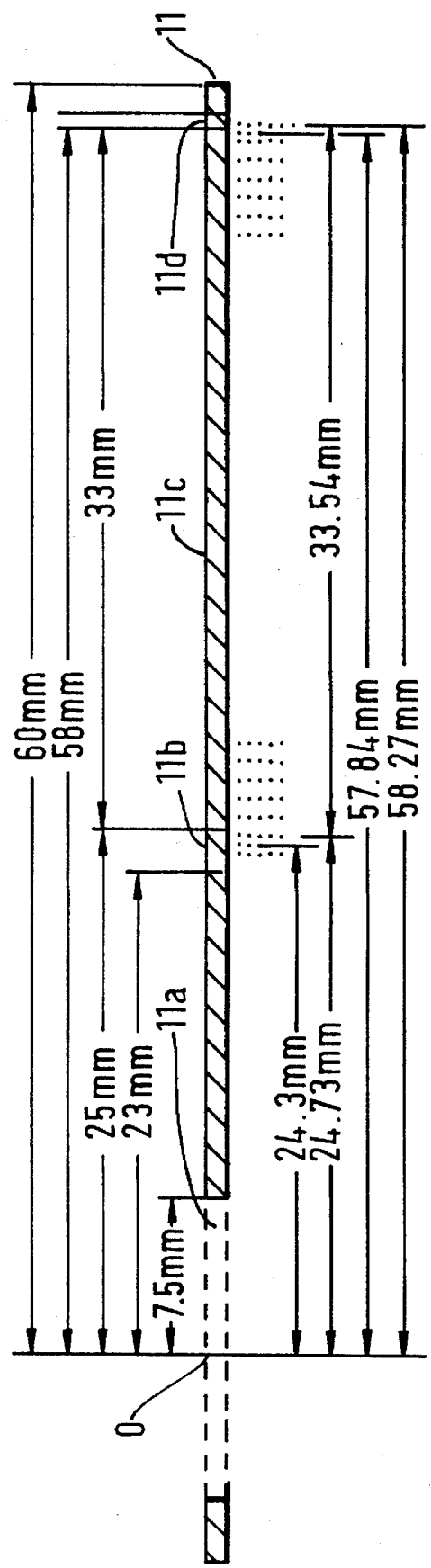
FIG. 1 provides a section view of the compact disc for illustrating positions of a plurality of the pickup devices in an example of the disc reproducing apparatus.

FIG. 1 represents cross section of the CD-ROM disc 11 which has a 60 mm radius, wherein the cross section is obtained by cutting along line through center O of the CD-ROM disc 11.

This CD-ROM disc 11 which has center O allocates the data area as follows. A face of the CD-ROM disc 11 contains the data area. The data area on the disc is composed of a plurality of the ring shaped data areas 11b, 11c, 11d (hereinafter the data areas) indicated as follows.

The CD-ROM disc 11 has a center O and a center hole 11a with 7.5 mm radius. The read-in area 11b is located nearest the outer area of the center hole 11a and is located between 23 mm–25 mm from the center O. The read-in area 11b stores the TOC (Table Of Contents) data. The program area 11c stores the main data and is located between 25 mm–58 mm from the center O. The read-out area 11d indicates the end of the program area 11c and is located 58 mm–60 mm from the center O.

A plurality of optical pickup devices are arranged above the CD-ROM disc 11. The lens of each optical pickup device is able to move in a radial direction of the CD-ROM disc 11. The center of the lens which is located in the first optical pickup device #1 is arranged at a position of radius of 24.3 mm from the center in the read-in data area 11b. A plurality of the optical pickup device #1–#40 are arranged along radial directions of the CD-ROM disc 11, wherein each optical pickup device is arranged at the same track interval one to another. The program area 11c is covered by moving of each lens of the optical pickup device #2–#40.

Each body of the optical pickup device is fixed, but each lens of the optical pickup device is movable. The optical pickup device #40 is arranged near the most outer cicumference of the CD-ROM disc 11. The center of the lens of the optical pickup device #40 is arranged at the position of 57.84 mm radius direction. The area which is separated by a dotted line in FIG. 1 is the movable area of a lens of the optical pickup device.

Figure 2:
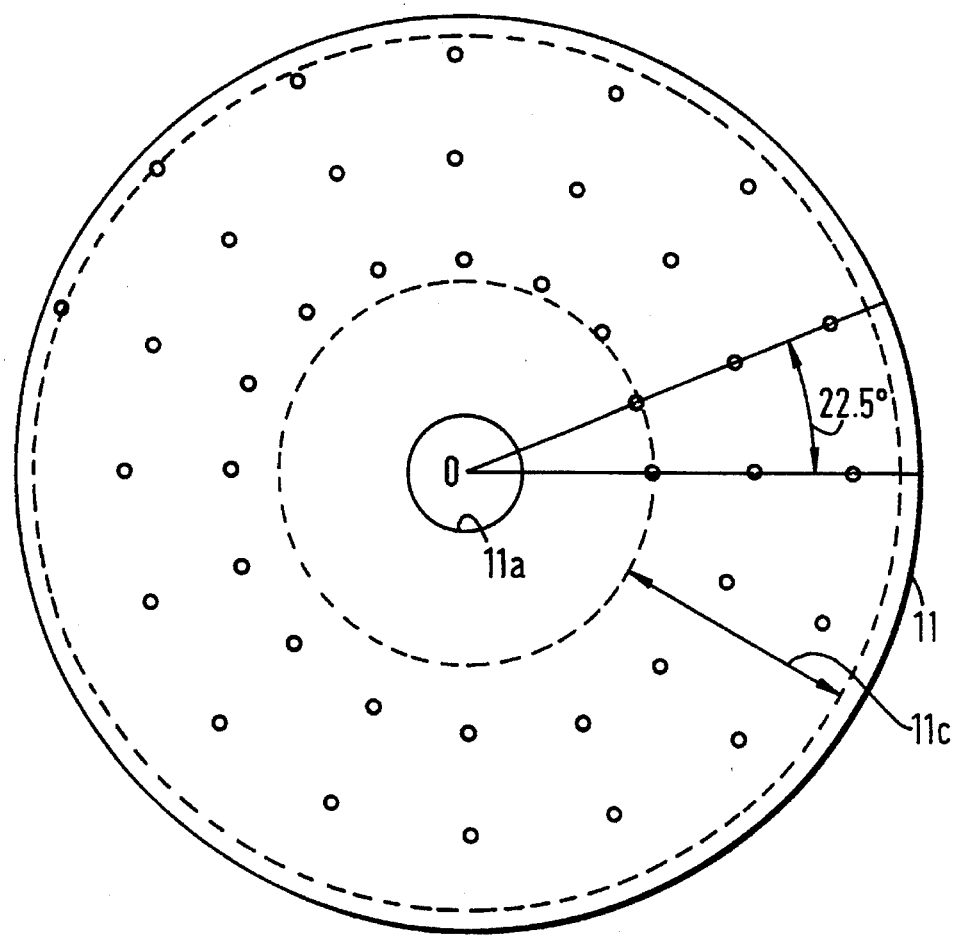
FIG. 2 provides a plane face view of the compact disc and positions of a plurality of pickup devices in the example.

In FIG. 2, the arrangement of the optical pickup devices above the disc is a spiral pattern, and each of the optical pickup devices are arranged at the same track interval and is arranged above a plurality of radial lines which have the center O in common and which form at the angle of 22.5 degrees. Each circle mark in FIG. 2 represents the center of the lens of an optical pickup device.

The disc reproducing aparatus for the CD-ROM disc 11 rotates the CD-ROM disc 11 and reads out all of the data stored on the CD-ROM disc 11 by moving the lens of each optical pickup devices #1–#40 in the radius direction of the CD-ROM disc 11 at the same time. The disc reproducing apparatus for the CD-ROM disc 11 is able to read out all of the data stored on the CD-ROM disc 11 in a short time.

The readable area of a lens of the optical pickup device is defined as follows. 39 optical pickup devices read out the data from the program data area 11c which has 33 cm radius. The readable area of a lens of each optical pickup device has 33/39=0.846 mm radius. The actual readable area of a lens of the optical pickup device has 0.86(0.846 mm+margin) radius and equals to 538 tracks The distance between the lens of each optical pickup device is 0.86 mm. For considering the bias of center of the CD-ROM disc 11 and the accuracy of attachment position of the optical pickup device, the margin needs plus/minus 300 mm. The movable distance of the lens of the optical pickup device is plus/minus 0.72 mm (plus/minus 450 tracks).

Figure 3:
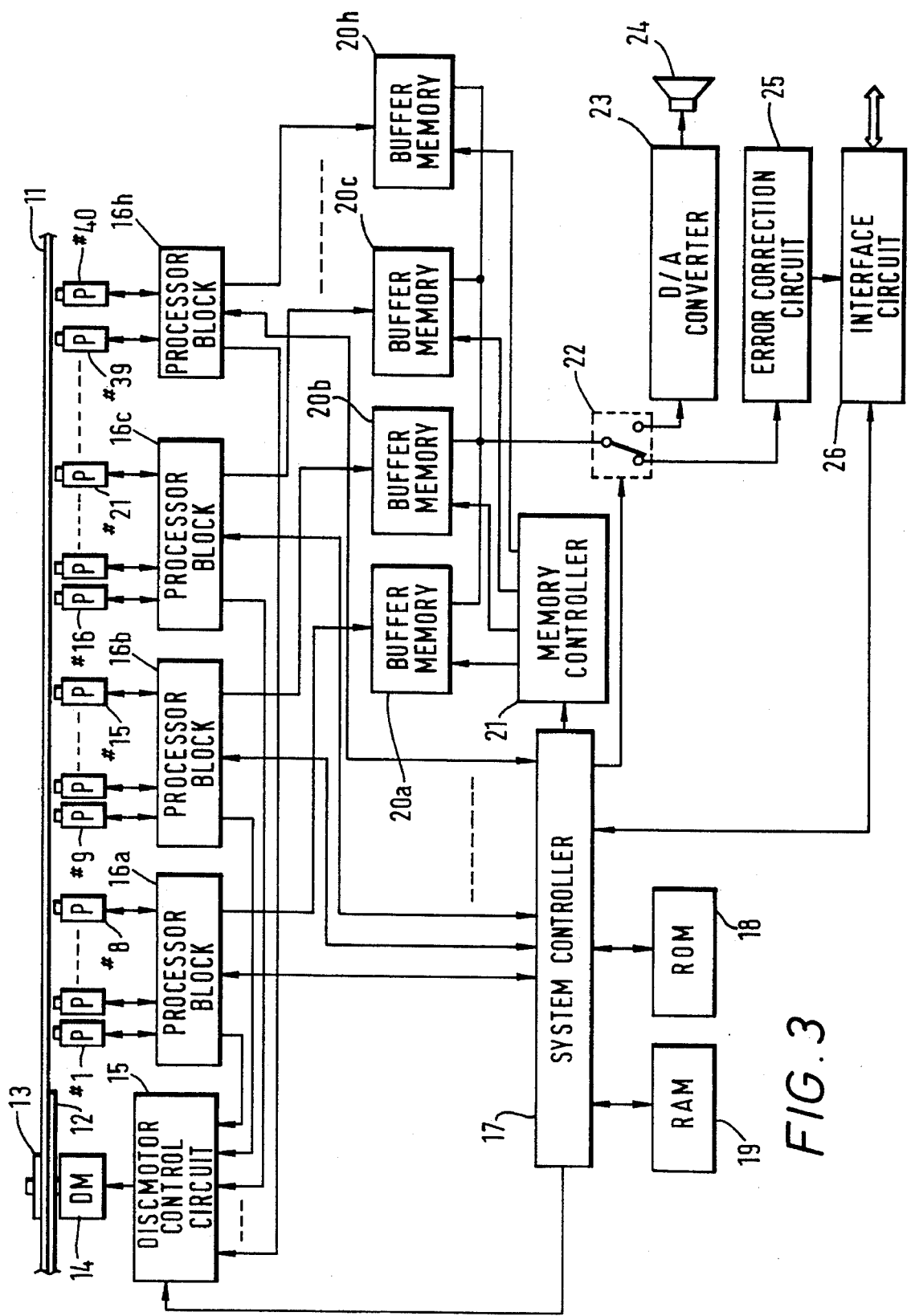
FIG. 3 provides an outline block diagram of the disc reproducing apparatus in the example.

FIG. 3 provide an outline composition of the disc reproducing aparatus which reads out the data stored on the CD-ROM disc 11 by using 40 optical pickup devices. The CD-ROM disc 11 is able to store more the 70 minutes of the data in the CD format. But, for convenience, the disc reproducing aparatus is able to read out 60 minites (eqauls to 540 MByte in the mode 1) of the data stored on the CD-ROM disc 11.

The CD-ROM disc 11 is held by turn table 12 and clamper 13 and is rotated by the disc motor 14. The rotation speed of the disc motor 14 is controlled by disc motor control circuit 15. The optical pickup devices #1–#40 are arranged above the data storing face of the CD-ROM disc 11. The optical pickup devices #1–#40 are divided into 8 groups, wherein the first group which is placed at the position of the nearest inner circumference comprises 8 optical pickup devices #1–#8, the second group comprises 7 optical pickup devices #9–#15, the third group comprises 6 optical pickup devices #16–#21, the forth group comprises 5 optical pickup devices #22–#26, the fifth group comprises 5 optical pickup devices #27–#31, the sixth group comprises 4 optical pickup devices #32–#35, the seventh group comprises 3 optical pickup devices #36–#38, and the eighth group comprises 2 optical pickup devices #39–#40. Each group is connected to 8 processor blocks 16a–16h.

The optical pickup devices #1–#8 are connected to the processor block 16a, the optical pickup devices #9–#15 are connected to the processor block 16b, the optical pickup devices #16–#21 are connected to the processor block 16c, the optical pickup devices #22–#26 are connected to the processor block 16d, the optical pickup devices #27–#31 are connected to the processor block 16e, the optical pickup devices #32–#35 are connected to the processor block 16f, the optical pickup devices #36–#38 are connected to the processor block 16g, and the optical pickup devices #39–#40 are connected to the processor block 16h, wherein the processor block 16a–16h are indicated in FIG. 3. Each processor block 16a–16h comprises a sub controller which is composed of a micro computer. The sub controller generates the processing data and sub code data by processing the RF signal which is detected by the optical pickup devices #1–#40. And the sub controller generates the servo signals for controling the optical pickup devices #1–#40 and motor control signals for controling the disc motor. The processor blocks 16a–16h generate the motor control signals from the optical pickup device connected with each processor block wherein the optical pickup device is placed nearby the inner circumference of the CD-ROM disc 11. The processor block 16a generates the motor control signal corresponding to the optical pickup device #1. The processor block 16b generates the motor control signal corresponding to the optical pickup device #9. The processor block 16c generates the motor control signal corresponding to the optical pickup device #16. The processor block 16d generates the motor control signal corresponding to the optical pickup device #22. The processor block 16e generates the motor control signal corresponding to the optical pickup device #27. The processor block 16f generates the motor control signal corresponding to the optical pickup device #32. The processor block 16g generates the motor control signal corresponding to the optical pickup device #36. The processor block 16h generates the motor control signal corresponding to the optical pickup device #39. The motor control signal corresponding to each optical pickup device is supplied to the disc motor control circuit 15.

Each sub controller which is involved in the processor block 16a–16h and controls the processor block 16a–16h is controlled by system controller 17. The system controller 17 is controlled by a computer program which is stored in the ROM 18. The system controller 17 controls the entire disc reproducing apparatus by using RAM 19. The disc motor control circuit 15 selects one of the motor control signals corresponding to each processor block 16a–16h by the signal from the system controller 17.

Each processor block 16a–16h is connected with each buffer memory 20a–20h. The processing data and the sub-code data is written in each buffer memory 20a–20h corresponding to each processor block 16a–16h. The system controller 17 controls memory control circuit 21 for controling each buffer memory 20a–20h. The system controller 17 controls switch 22. If the data from the buffer memory 20a–20h is computer data or digital audio data, the switch 22 is switching by change of the data, wherein the data is switched according If the data is digital audio data, the buffer memory 20a–20h is connected with D/A converter 23 by the switch 22, the digital audio data is converted to analog audio data by the switch 22 and supplied to a speaker 24. If the data is computer data, the buffer memory 20a–20h is connected to error correction circuit 25 by the switch 22, then the computer data is supplied to error correction circuit 25. The error correction circuit 25 corrects the error of the data. The data corrected is transfered to a host computer (not shown) through the interface circuit 26. The disc reproducing apparatus is controlled by commands which are transfered from the host computer.

Figure 4:
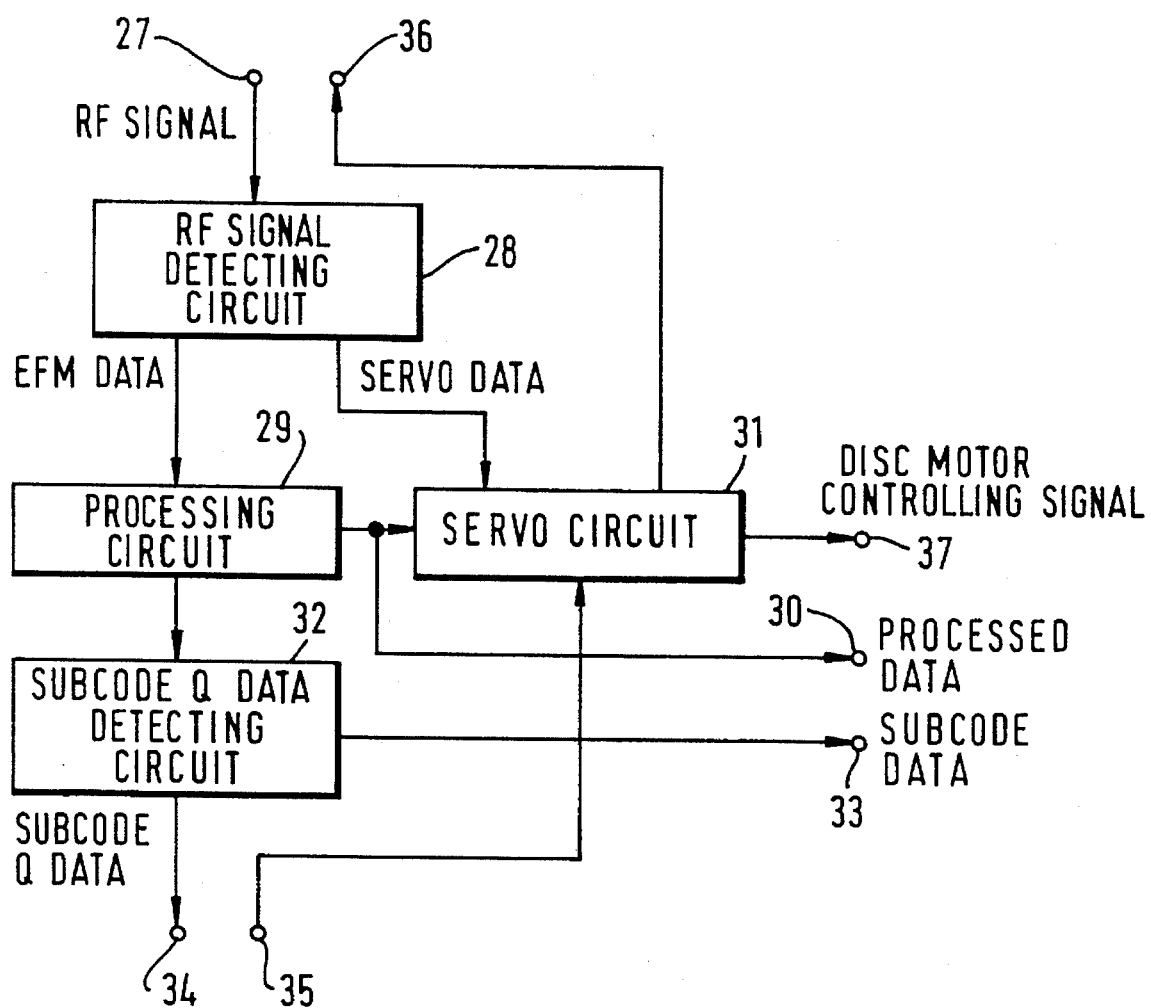
FIG. 4 provides a block diagram of the signal processing unit in the example.

Each processor block 16a–16h comprises a signal processing block for processing the RF signal. The signal processing block processes the signal obtained from each optical pickup device #1–#40. The number of signal processing blocks is 40. The signal processing block coresponds to each optical pickup device #1–#40. The number of the signal processing block corresponds to the number of the optical pickup device #1–#40 which is connected with each processor block 16a–16h. The processor block 16a has 8 signal processing blocks. The sub controller which is contained in the processor block 16a controls the all of the 8 signal processing blocks. FIG. 4 represents a signal processing block for processing the RF signal which is obtained from each optical pickup device #1–#40.

The RF signal obtained from the optical pickup device is supplied to input terminal 27. The RF signal which is supplied to input terminal 27 is also supplied to RF signal detecting circuit 28. The RF signal detecting circuit 28 separates EFM (Eight to Fourteen Modulation) data and the servo data from the RF data. The EFM data is supplied to the processing circuit 29. The processing circuit 29 shapes the wave form of the EFM data signal and processes the EFM data signal. The EFM data signal which is a processed and separated part of the syncronizing signal is supplied to the buffer memory 20a–20h through output terminal 30 and to servo circuit 31. The processing circuit 29 corrects the error of the EFM data signal if the EFM data signal is an audio signal.

The syncronizing signal which is output from the processing circuit 29 is supplied to the subcode Q data detecting circuit 32. The subcode Q data detecting circuit 32 detects the subcode data. The subcode data is output to the buffer memory 20a–20h through the output terminal 33 and the system controller through the output terminal 34. The servo circuit 31 generates a tracking servo signal and a focus servo signal to corresponding to one of the optical pickup device #1–#40, wherein both of the tracking servo signal and the focus servo signal is generated corresponding to the servo signal which is output from the RF signal detecting circuit 28 and the data from the processing circuit 29 and the servo control signal from the system controller 17 through the input terminal 35. The servo circuit 31 outputs the tracking servo signal and the focus servo signal for one of the pickup device #1–#40 through the output terminal 36 and generates a disc motor control signal and supplies the disc motor control signal to the disc motor control circuit 15 through the output terminal 37.

Figure 5:
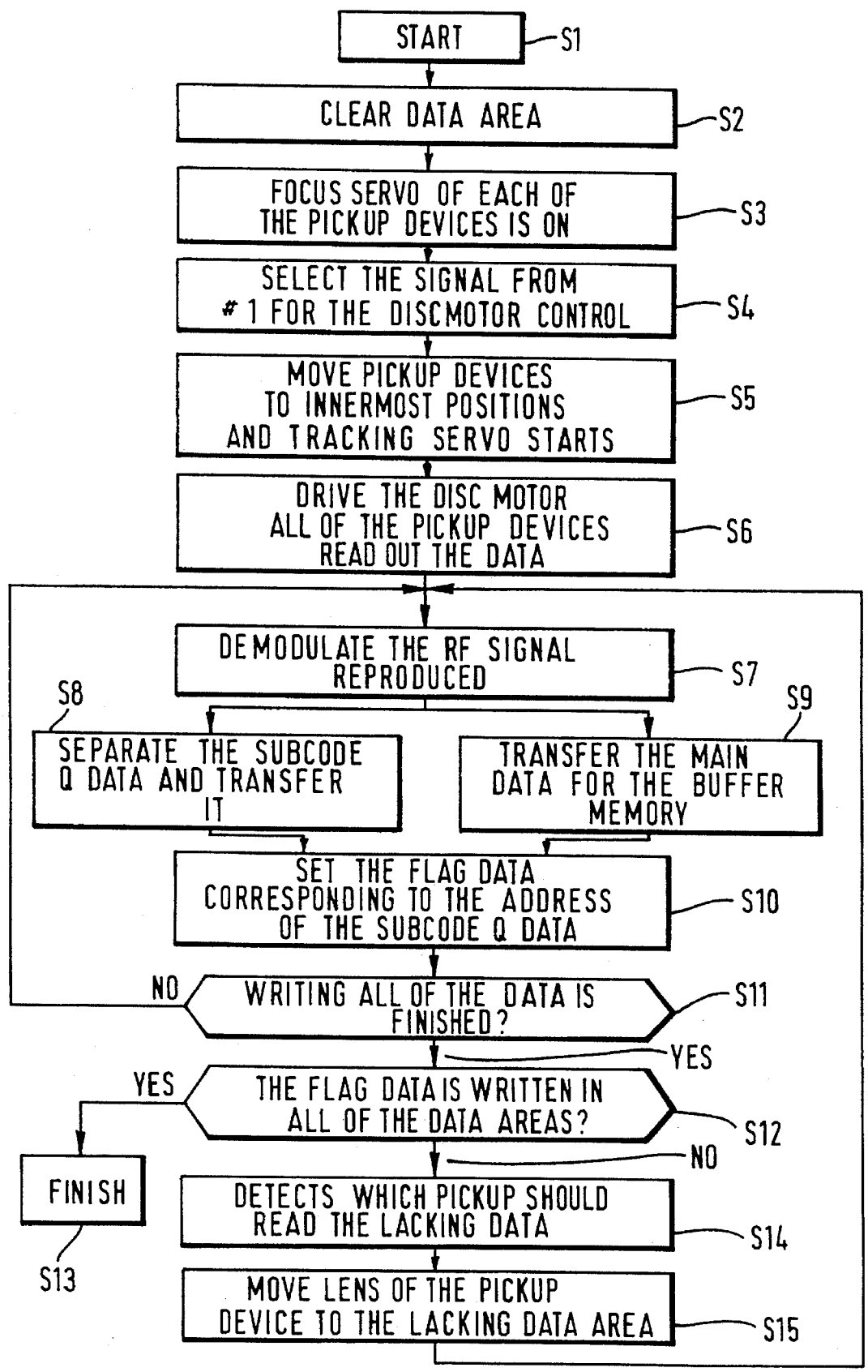
FIG. 5 provides a flow chart diagram for explanation of the action of the disc reproducing apparatus in the example.

FIG. 5 represents the flow chart diagram for explaining the operation of the system controller 17 in the case of reading out of the data. The system controller 17 reads out the data corresponding to the program stored in the ROM 18. The program is composed of 15 steps. Process corresponding to the program starts at the step S1. All of the data area in the RAM 19 is cleared at the step S2. The data management area is the data area which stores the management data for certifying that the data stored in one of the data sectors of the CD-ROM disc 11 is read out and stored in the buffer memory 20a–20h. The CD-ROM disc 11 stores 60 minutes of data. The number of sectors on the CD-ROM disc 11 is 60×60×75=270000. If each bit of the management data represents one sector, the capacity of the RAM 19 for storing the management data must be 270000/8=33750 bytes. If each byte of the management data represents one sector of the data, the capacity of the RAM 19 must be 270000 bytes. The management data may be written in the data area which is set in the RAM 19 or a part of the buffer memory 20a–20h. If the management data is written in a part of the buffer memory 20a–20h, it is desirable that the management data is processed for every byte. For example, one byte of the flag data for identifying the sector which stores 2352 bytes of the data is written in the next byte area which is followed after the 2352th byte. The actual ammount of the data which is stored in one sector is 2352+1=2353 bytes of the data.

The system controller 17 controls to start focus servo of all optical pickup device #1–#40 at the step S3. The system controller 17 controls the disc motor velocity corresponding to the disc motor control signal obtained by the optical pickup device #1 which is at the most inner circumference side of the CD-ROM disc 11 at the step S4. The system cotroller 17 supplies the disc motor control signal for the disc motor control circuit 15 and the disc motor control circuit 15 cotrols the rotation velocity of the disc motor 14. The CD-ROM system adopts the constant linear velocity from the CD-ROM disc 11 rotation speed which is in a range of about 535 rpm to about 190 rpm. The CD-ROM disc 11 rotation speed is 535 rpm.

In step S5 cotroller 17 moves all optical pickup devices #1–#40 toward the inner circumference of the disc and tracking servo begins. The system cotroller 17 controls to rotate the disc motor 14 through the disc motor control circuit 15 at the step S6. Rotation of the CD-ROM disc 11 is controlled by the disc motor control signal obtained from the optical pickup device #1, rotation speed of the CD-ROM disc 11 is 535 rpm determined at the step S4. At this time, lenses of all optical pickup devices #1–#40 are operated by the focus servo and tracking servo and all optical pickup device #1–#40 read out the data at the same time. The system controller 17 controls the processor block 16a–16h to process the data read out by the optical pickup device #1–#40 at the step S7. The system controller 17 processes the data by EFM demodulation, interlieving process and error correction process corresponding to the CD format. At the same time, the subcode Q data which is stored as address data for idetification of the main data is separated from the data and the subcode Q data is translated for the system controller 17 at the step S8. The main data is transfered to the buffer memory 20a–20h at step 9. The main data does not comprise syncronizing data.

In this case, the subcode Q data is transfered to the buffer memory 20a–20h also, and the main data is written in the data area of the buffer memory 20a–20h, which is indicated by the subcode Q data as the address data. 1 sector stores 2352 bytes and each 2352 byte data has an address for identification. In step S9, the main data is written in a data area indicated by a logic address, wherein the logic address is obtained by calculating from the subcode Q data reproduced. The main data corressponds to the address perfectly. By managing the address all of the data stored on the disc can be written in the buffer memory 20a–20h without data less. In the FIG. 3, 8 processor blocks 16a–16h are connected with 8 buffer memories 20a–20h, but each processor blocks 16a–16h may be connected with one memory actually.

If all optical pickup devices #1–#40 are connected with a memory, all optical pickup device #1–#40 must read out the data and need to write all of the data at the same time. Thus the access frequency to the memory is reduced by each buffer memory 20a–20h. To reduce the load of each processor block 16a–16h, the optical pickup devices #1–#8 are connected to the processor block 16a the optical pickup devices #9–#15 are connected to the processor block 16b, the optical pickup devices #16–#21 are connected to the processor block 16c, the optical pickup devices #22–#26 are connected to the processor block 16d, the optical pickup devices #27–#31 are connected to the processor block 16e, the optical pickup devices #32–#35 are connected to the processor block 16f, the optical pickup devices #36–#38 are connected to the processor block 16g and the optical pickup devices#39–#40 are connected to the processor block 16h. Therefore, amount of the data read out by each processor block 16a–16h is constant among the processor block 16a–16h.

At the step 10, the system controller 17 sets the flag data corresponding to the address in the RAM 19, if main data is written in the data area of each buffer memory, wherein the data area corresponds to the address.

At the step S11, the system controller 17 determines if all of the data is written in the buffer memory 20a–20h.

If each optical pickup device #1–#40 reads out 538 tracks of the data, all of the data is read out.

The means for determining comprises the following:

(a) measuring means for counting rotations of the disc, wherein the means comprises a generator for generating a pulse for every rotaion and a pulse counter for counting pulses.

(b) waiting means for waiting for a waiting time which is calculated theorically, for example, the disc rotation speed is 535 rpm, the waiting time is 538/535=1 mm corresponding to 1 minute and 5 seconds. The waitng time is calculated with considering the margin. The disc is rotated during the waiting time.

(c) management means for managing the subcode Q data which is trasfered to the system controller 17. The system controller is wating while the value of subcode Q data is varied by a value corresponds to 538 tracks.

If not all of the data is written in the buffer memory 20a–20h (NO), the system controller 17 operates the process of the step S7 again, or if all of the data is written in the buffer memory 20a–20h (YES), the system controller 17 operates the process of the step S12. At the step S12, the system controller 17 determines the result, whether the flag data is set in all of the data area. Theorically, at the step S11, if the system controller 17 determines that the flag data is set in all the data area, all of the data is written in the buffer memory 20a–20h, but actually, all of the data may not be read out because of a track jump caused by a scratch on the disc or lack of the data cause by a stain on the disc. If 10 tracks are Jumped in the direction of the outer circumference, 10 tracks of the data is missed and the data corresponding to 539–549 track is written in the buffer memory 20a–20h a second time.

At step S12, the system controller 17 detects whether the flag data is set in all of the data area of RAM 19. If the flag data is set in all of the data area of RAM 19, the system controller 17 determines whether all of the data is written in the buffer memory 20a–20h and finishes the process at the step S13. If the flag data is not set in all of the data area of RAM 19, the system controller 17 determines that all of the data is not written in the buffer memory 20a–20h (NO) and computes the optical pickup device read out whose data is missing at step S14. If the missing data is stored at the data area at the 59 minutes 59 second 74 sector on the disc, the optical pickup device which read out the missing data is #40. In this case, the system controller 17 controls the disc motor control circuit 15 to control rotation of the disc motor 14 corresponding to the disc motor control signal obtained from the optical pick up device #39 nearby the optical pick up device #40 so the optical pickup device which read out the missing data is able to read out the data at about the most desirable rotation speed for the optical pickup device. Therefore, the reading ability of the optical pickup device is increased and the error correcting ability of the optical pickup device is increased and the data is read out more precisely. The system controller 17 collects the data again through the optical pickup device which read out the lacking data at the step S15. The system controller 17 controls the optical pickup device which read out the missing data to read out the data and moves the optical pickup device which read out the missing data to the front of the data area which contains the missing data and performs the process of step S7. Accessing the data area and reading out the missing data again requires time to move the lens (10 ms)+ waiting time for rotation the disc (100 ms). If a plurality of missing data is read out, a plurality of the optical pickup devices read out the missing data again, therefore it is able to read out the missing data again rapidly.

In this example, the disc reproducing apparatus is able to read out all of the data stored on the disc rapidly, since all of the data stored on the CD-ROM disc 11 is read out by each of the lens of 40 optical pickup devices which are arranged in radial directions of the CD-ROM disc 11 at the same time. Therfore the time for reading out all of the data stored on the disc is decreased to about 1/60 as compared to the conventional appartus. All of the data is read out by only moving the lens of the optical pickup device, therefore, the disc reproducing apparatus does not need the moving mechanism for moving the optical pickup device and the composition of the disc reproducing apparatus is simplified and is operated more.

All of the data which is read out from the disc is stored in the buffer memory 20a–20h, therefore, if the host computer accesses the data, all of the data is able be read out from the buffer memory 20a–20h by electrical means which indicate the address without mechanical means and accessing speed for the host computer is higher by 3–4 times than the conventional apparatus.

The management data is written in the RAM 19, for detecting whether the data is written in the buffer memory 20a–20h completely or not completely. Therefore, the disc reproducing apparatus is able to detect the missing data and read out the missing data again by inspecting the management data stored in the RAM 19. If the disc reproducing apparatus reads out the missing data again, the disc rotation speed is set to correspond to the optical pickup device which reads out the missing data and fit the optical pickup device, therefore, the data reading ability of the disc reproducing apparatus and the data correction ability of the disc reproducing apparatus increase and the disc reproducing apparatus is able to read out the data more precisely.

Figure 6:
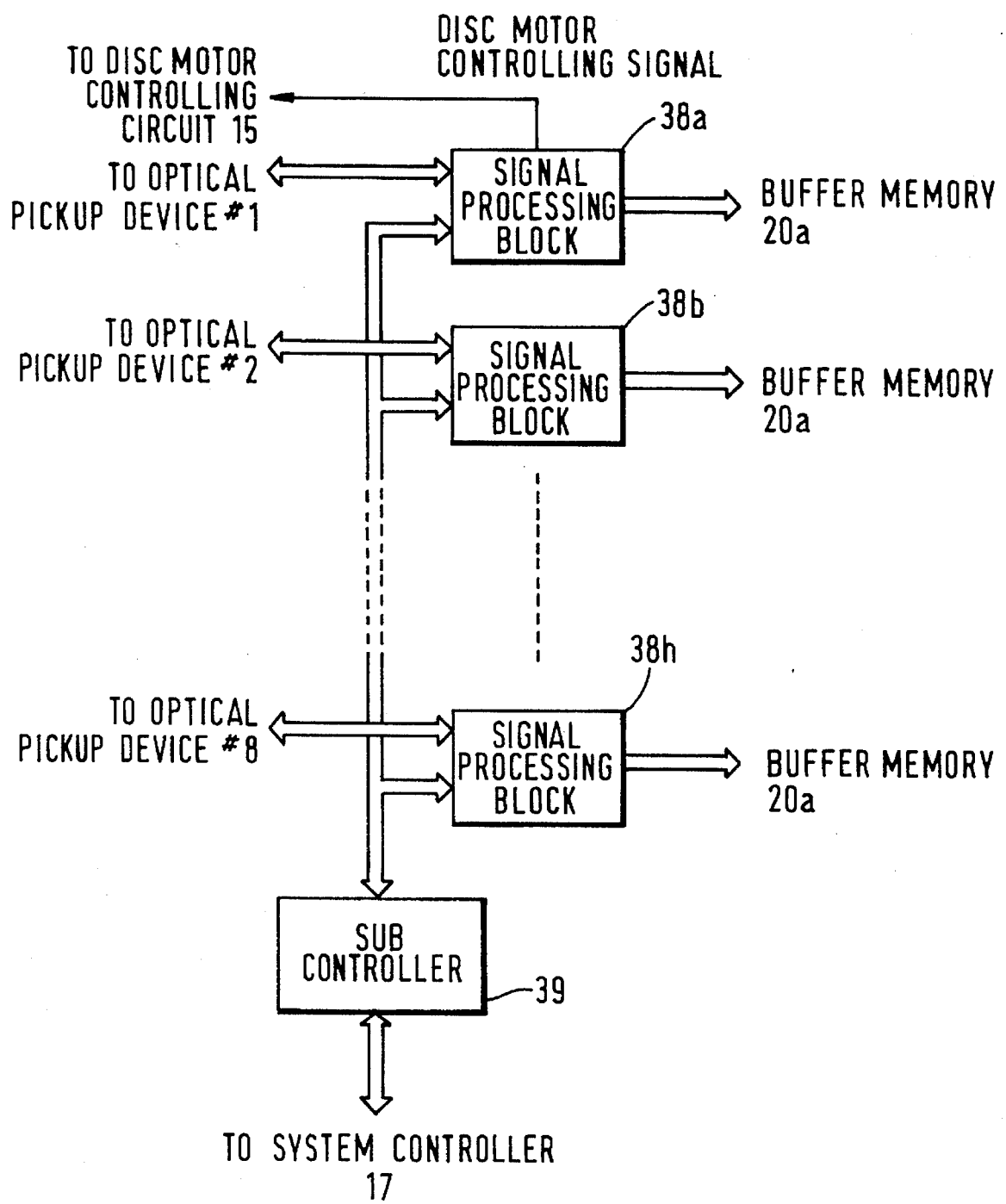
FIG. 6 provides a block diagram of a processing unit in the example.

FIG. 6 represents the inner composition of the processor block 16a in detail. The inner composition of the other processor blocks 16b–16h is the same as the inner composition of the processor block 16a. Therfore, explanation for the inner composition of the other processor blocks 16b–16h is omitted. The processor blocks 16a comprises the signal processing blocks 38a–38h which is connected with each optical pickup device #1–#8. The signal processing blocks 38a–38h generates the demodulating data and the subcode data, trasfers the demodulating data and the subcode data to the buffer memory 20a, generates tracking servo signal and focus servo signal for control the optical pickup device #1–#8, and generates a disc motor control signal for controlling the rotation speed of the disc, corresponding to the RF signal.

A disc motor control signal is generated by the signal processing block 38a which is connected with the optical pickup device #1 and is transfered to the disc motor control circuit 15. Each processor blocks 38a–38h is controlled by the subcontroller 39 and the subcontroller 39 is controlled by the system controller. 17.

Figure 7:
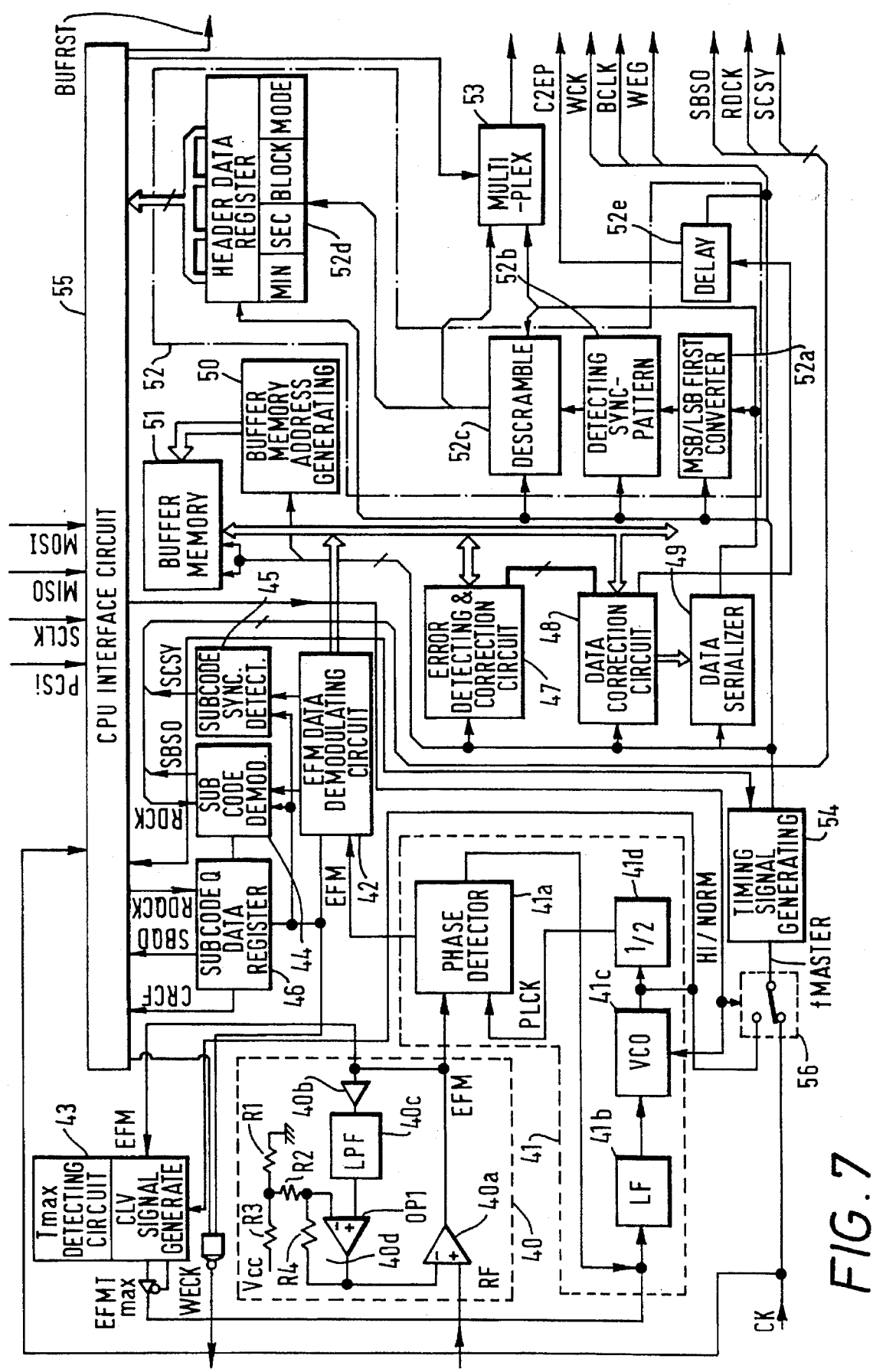
FIG. 7 provides a block diagram of the signal processing unit in detail.

FIG. 7 represents composition of the signal processing block 38a in detail. Composition of the other signal processing blocks 38b–38h is the same as the composition of the signal processing block 38a. Therefore, the explanation for other signal processing blocks 38b–38h is omited. The signal processing blocks 38a–38h mainly are composed of EFM data slicing circuit 40, EFM-PLL(Phase locked looping) circuit 41, EFM data demodulating circuit 42, $T_{max}$-(maximum turning pole interval) detecting circuit 43, subcode data demodulating circuit 44, subcode synchronizing signal detecting circuit 45, subcode Q data register 46, error detecting and error correction circuit 47, data correction circuit 48, data serializer 49, buffer memory address generating circuit 50, buffer memory 51, CD-ROM interface circuit 52, data multiplier 53, system control timing signal generating circuit 54, CPU interface circuit 55, and clock signal switching circuit 56.

The EFM data slicing circuit 40 is composed of high speed comparater 40a, buffer circuit 40b which buffers output of the high speed comparater 40a, LPF(Low Pass Filter) 40c which integrates output of the high speed comparater 40a, and error amplifier 40d which comprises operation amplifier OP1 and register R1–R4. The EFM-PLL circuit 41 is composed of phase detector 41a, LF(Loop Filter) 41b, VCO(Voltage Control Oscilater) 41c, and ½ fequency devider 41d. The CD-ROM interface circuit 52 is composed of MSB-first/LSB first converter 52a, synchronizing pattern of CD-ROM detecting circuit 52b, descrambler 52c, CD-ROM header data register 52d, and delay circuit 52e for tuning timing of C2 error pointer.

The operation of those circuit will now be explained. The EFM data slicing circuit 40 excepts asymmetry from the EFM data which is obtained from the optical pickup device #1 and is a shaped pulse. The EFM signal is digital modulation signal which has appeerence frequency of '0' or '1' of 50%. The EFM signal which is a sliced level and converted rectangle wave signal by the high speed comparater 40a is converted direct current voltage by LPF 40c and compared with a reference voltage($V_{cc}/2$) by the error amplifier 40d. The output level of the error amplifier 40d is the slicing level. If the EFM signal which maintains symetry is input to the high speed comparater 40a, the slicing level is constant, but, if an EFM signal which does not maintain symetry is input to the high speed comparater 40a, the output of the error amplifier 40d is varied by the degree of asymety and the EFM signal is controlled to be symetric automatically.

The EFM signal which is output from the EFM data slicing circuit 40 is a self clocking signal and comprises a clock pulse(2.1608 MHz at the reproducing in general).

The EFM signal is input in the EFM-PLL circuit 41 and a bit synchronizing clock pulse PLCK(4.321 MHz at the reproducing in general) is reproduced. The timing of the EFM signal input is reset by bit synchronizing clock pulse PLCK and the EFM signal which synchronizes the bit synchronizing clock pulse PLCK is outputted to the EFM data demodulating circuit 42. The EFM data demodulating circuit 42 generates a frame synchronizing signal and demodulates 8 bit data which is converted from 14 bit to 8 bit. The EFM signal comprises a requirement signal for writing the data in the buffer memory and a frame synchronizing pattern which is needed for generating a write-in clock frame pulse(EFM synchronizing clock pulse WFCK). The EFM data demodulating circuit 42 detects the frame synchronizing pattern and generates the frame synchronizing signal and prevents detection of a frame syncronizing signal when data is missing, and obtains a stabilizing frame synchronizing signal.

The 8 bit demodulated data is written In the buffer memory 51 to perform error corrections. The 8 bit data which is written in the buffer memory 51 is read out from the buffer memory 51 corresponding to requirements from the error detecting and error correction circuit 47. The demodulated data is formed into a data stream which is interleaved with the interleaving process being a delaying process. Therefore, in the case of reading out the data from the buffer memory 51 for error detecting and error correction, the interleave operation is carried out by varying the delay time according to the control of the address generating circuit 50.

The data which has the errors detected and corrected are transfered to the data correction circuit 48 with the C2 pointer corresponding to the requirement from the data correction circuit 48. If the data input is computer data(CD-ROM data), the data correction circuit 48 does not correct the data, the data is transfered to the data serializer 49. If the data input is audio data, the data correction circuit 48 processes the data average correction, the held data is input or muted and the data is transfered to the data serializer 49.

If the data which is supplied to the data serializer 49 is audio data, the data is converted to serial audio data which is MSB first data sampled at 16 bits and output to the buffer memory 20a through the data multiplier 53 with a synchronizing pulse and a writing control signal. If the data which is converted serially by the data serializer 49 is CD-ROM data, the CD-ROM data is converted the MSB first to LSB first and the synchronizing pulse is detected and descrambled by the CD-ROM interface circuit 52. The CD-ROM data is serialized in the LSB format and transfered to the buffer memory 20a through the data multiplier 53.

The subcontroller 39 is able to monitor 4 bytes of header data of the CD-ROM sector data which is transfered to the buffer memory 20a through the CPU interface circuit 55. The control to transfer the CD-ROM sector data to buffer memory 20a is operated by monitoring 3 byte data of the CD-ROM header data(MIN,SEC,BLOCKS).

The subcode data which is stored in other channels of the channel which stores the CD-ROM data or the audio data is used for detecting 14 bit subcode synchronizing pattern S0,S1, sampling the subcode synchronizing pattern S0,S1 by the EFM synchronizing signal WFCK, and generating a subcode frame synchronizing signal SCSY. The subcode data P-W of EFM data row which is demodulated is synchronized with the EFM frame synchronizing signal WFCK and transfered to register which is located in the subcode data demodulating circuit 44, and the subcode Q data is synchronized with writing frame clock signal WFCK,and gradually stored in 80 bit of subcode Q data register 46 in order. In the subcode Q data register 46, the CRC calculation is operated as soon as the subcode Q data is shifted in and error checked for subcode Q data. The result of the checking is output as CRFC signal which is a synchronized subcode frame synchronizing signal SCSY.

Figure 8:
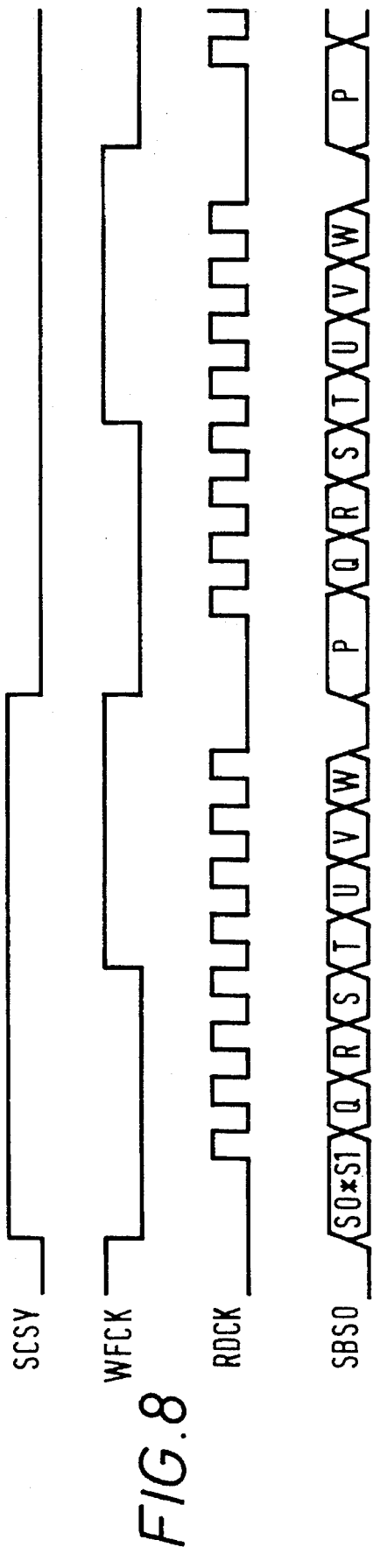
FIG. 8 provides a timing chart diagram for explaining the action of the processing unit.
Figure 9:
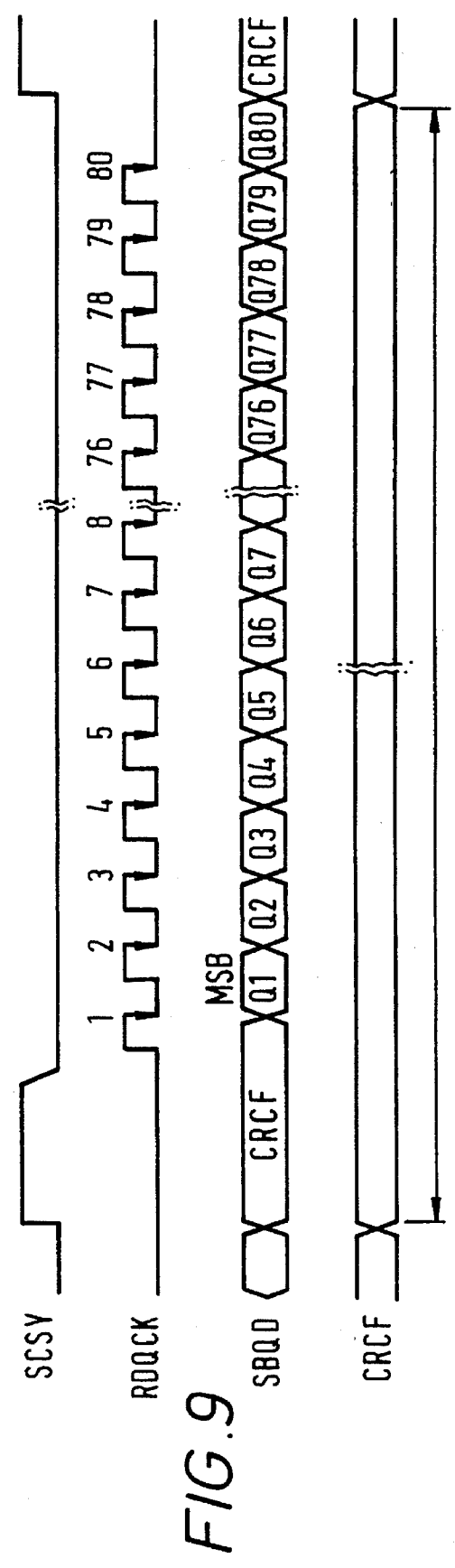
FIG. 9 provides a timing chart diagram for explaining the action of block diagram of the signal processing unit.

FIG. 8 represents the transfering format of the subcode data P-W, and FIG. 9 represents format of the subcode Q data.

The subcontroller detects that the subcode frame synchronizing signal SCSY is a high level and inputs 80 clock pulses in the subcode Q register 46. The subcontroller 39 is able to read out 80 bits of subcode Q data.

The subcode frame synchronizing signal SCSY is inserted, protected and is transfered to system control timing generating circuit 54 and is used as a reference timing signal which indicates the start or stop for controlling the transfering of audio data for the buffer memory 20a. When the audio data is read out by the command from the host computer, the data is able to be read out without missing data or reading duplicate data.

The $T_{max}$ detecting circuit 43 detects the frequency of the EFM signal and compulsively Varies controlling voltage applied to the VCO 41c of the EFM-PLL circuit 41 for synchronizing the EFM-PLL circuit 41 fast.

The frequency of the VCO 41c is controlled to be a provisional value which is composed of continuous maximum turning pole interval. The EFM-PLL circuit 41 is rocked at the provisional frequency by controlling the rotation of the disc fast.

In the explanation by reference to the flow chart diagram in FIG. 5, generally, the disc motor controlling signal generated corresponding to the signal which is obtained from the optical pickup device #1 controls the rotations of the disc. The locking frequency of the EFM-PLL circuit 30 which is comprised in the signal processing block corresponding to the other optical pickup devices #2–#40 is varied corresponding to the linear velocity of the beam spot. Therefore, the master clock of the system control timing generating circuit 54 which generates the timing signal for reading out the data from the buffer memory 51 which stores EFM processed data does not use a fixed frequency clock signal obtained by a crystal oscillater and instead uses a VCO clock signal which is generated from the EFM-PLL circuit 41.

Rotation of the disc is able to be controlled by the signal which is obtained from the optical pickup devices #1,#9, #16,#22,#27,#32,#36,#39 which are connected with each proccesor block 16a–16h and placed at the nearest inner circumference of the disc. The subcontroller 39 switches frequency of the EFM-PLL circuit 41c by the HI/NORM signal through the CPU interface circuit 55. HI mode is an automatic angle velocity control corresponding to the nearest inner circumference mode and NORM mode is a normal reproducing mode, the frequency of the EFM-PLL circuit 41c is locked to a provisional frequncy which is 8.6436 MHz. The clock signal switch 56 switches frequency of the EFM-PLL circuit 41c. The frequency which is switched is the VCO clock signal or the crystal oscilation clock signal(8.6436 MHz). The crystal oscilation clock signal is given by the system controller 17. The EFM frame synchronizing signal WFCK is used as the disc motor control signal which is supplied to the disc motor control circuit 15. The line of the EFM frame synchronizing signals WFCKi (i=1, 9,16,22,27,32,36,39) are adapted the open collector output form which is able to be wired-or conection. Therefore, the disc motor controlling circuit 15 does not need the selecter. One of the line of the EFM frame synchronizing signal WFCKi is usually an enable state. After initializing of the system, the line of the EFM frame synchronizing signal WFCK1 which is obtained from the signal processing block 38a is an enable state.

A line of the EFM frame synchronizing signal WFCK1 is selected by the system controller 17. The subcontroller which obtains the command from the system controller 17 controls the signal processing block which generates the EFM frame synchronizing signal WFCKi to operate the enable process or disenable process to the line of the EFM frame synchronizing signal WFCK.

The CPU interface circuit 55 has functions for transfering control data and status data in the serial form to the subcontroller 39. The CPU interface circuit 55 adopts a syncronizing serial interface which is able to transfer the data and connects a few lines and the subcontroller is master and signal processing block 38a–38h are slave. Signal line PCSi which is driven by the subcontroller 39 is L(Low) level and the CPU interface circuit 55 is operated. The control data from the host computer is transfered through the MOSI signal line and the status data from the signal processing block 38a is transfered through MISO signal line, wherein the status data and the control data are synchronized with a transfer clock signal from the subcontroller 39.

The data which is transfered on the MOSI signal line or the MISO signal line is shifted in or shifted out at the rising-up point of the transference clock signal. The SCLK signal line is driven at the clock rate of 4.2336 MHz, the time for transfering 1 byte of the data is about 2 μsec.

Figure 10:
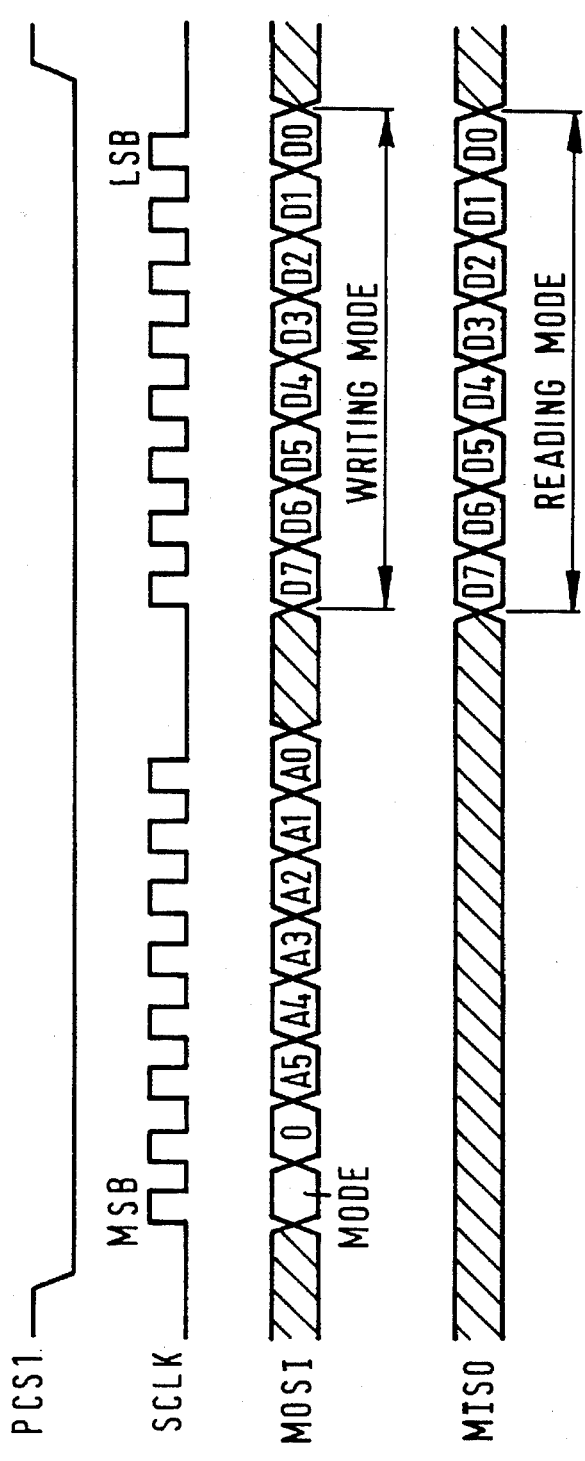
FIG. 10 provides a timing chart diagram for explaining the action of block diagram of the signal processing unit.
Figure 11:
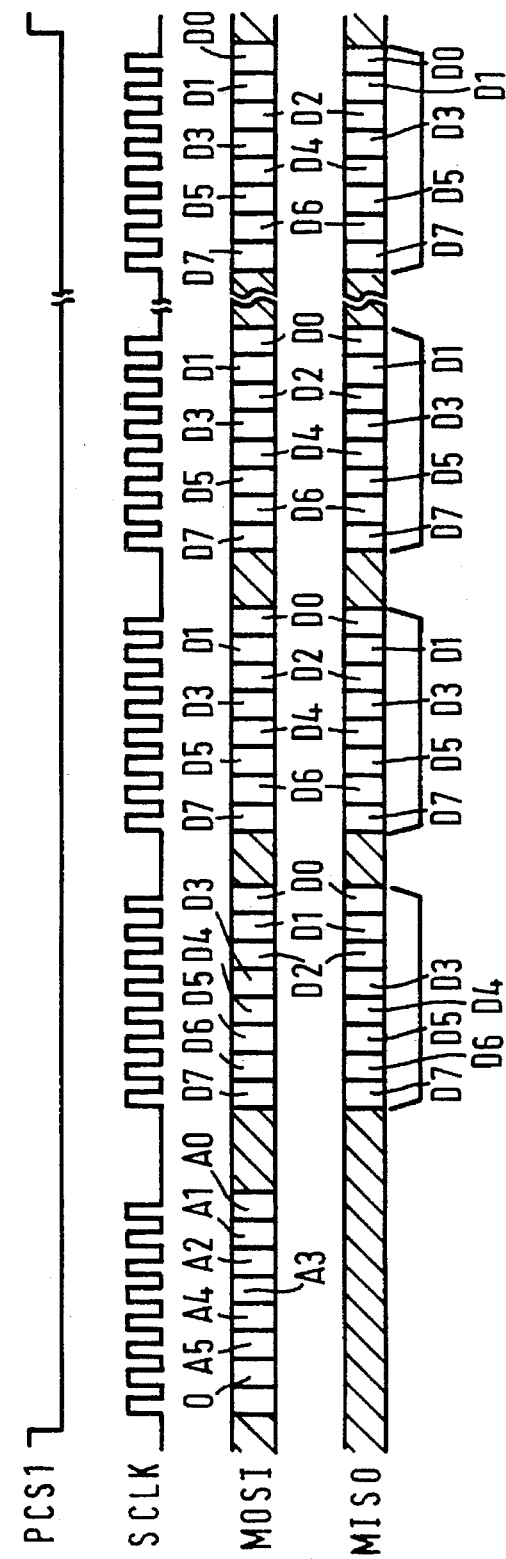
FIG. 11 provides a timing chart diagram for explaining the action of block diagram of the signal processing unit.

FIG. 10 and FIG. 11 represent the data transfering format of the CPU interface circuit 55, FIG. 10 represents the case of single register accessing and FIG. 11 represents the case of multi register accessing. The CPU interface circuit 55 indicates register address and read-out/write-in mode by mode/address data which is input by starting from its MSB after the PCSi signal changed to the L level. The data transfering is enabled by changing the PCSi signal L level. While the PCSi signal is L level, the register address is increased 1 bit automatically every transfer of 8 bit data. Data transfering for the register corresponding to address "3F(HEX)" is finished and the address comes back "00(HEX)" automatically.

Figure 12:
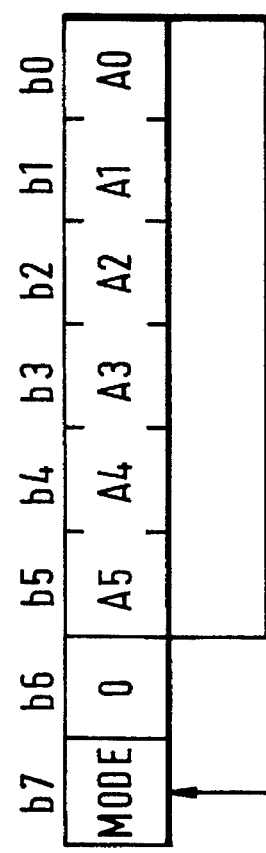
FIG. 12 provides a data format used in the signal processing unit.

After that the PCSi signal is H level, the register address and access mode is indicated by the first 8 bit data again. FIG. 12 represents data format of the 8 bit of mode/address data.

Figure 13:
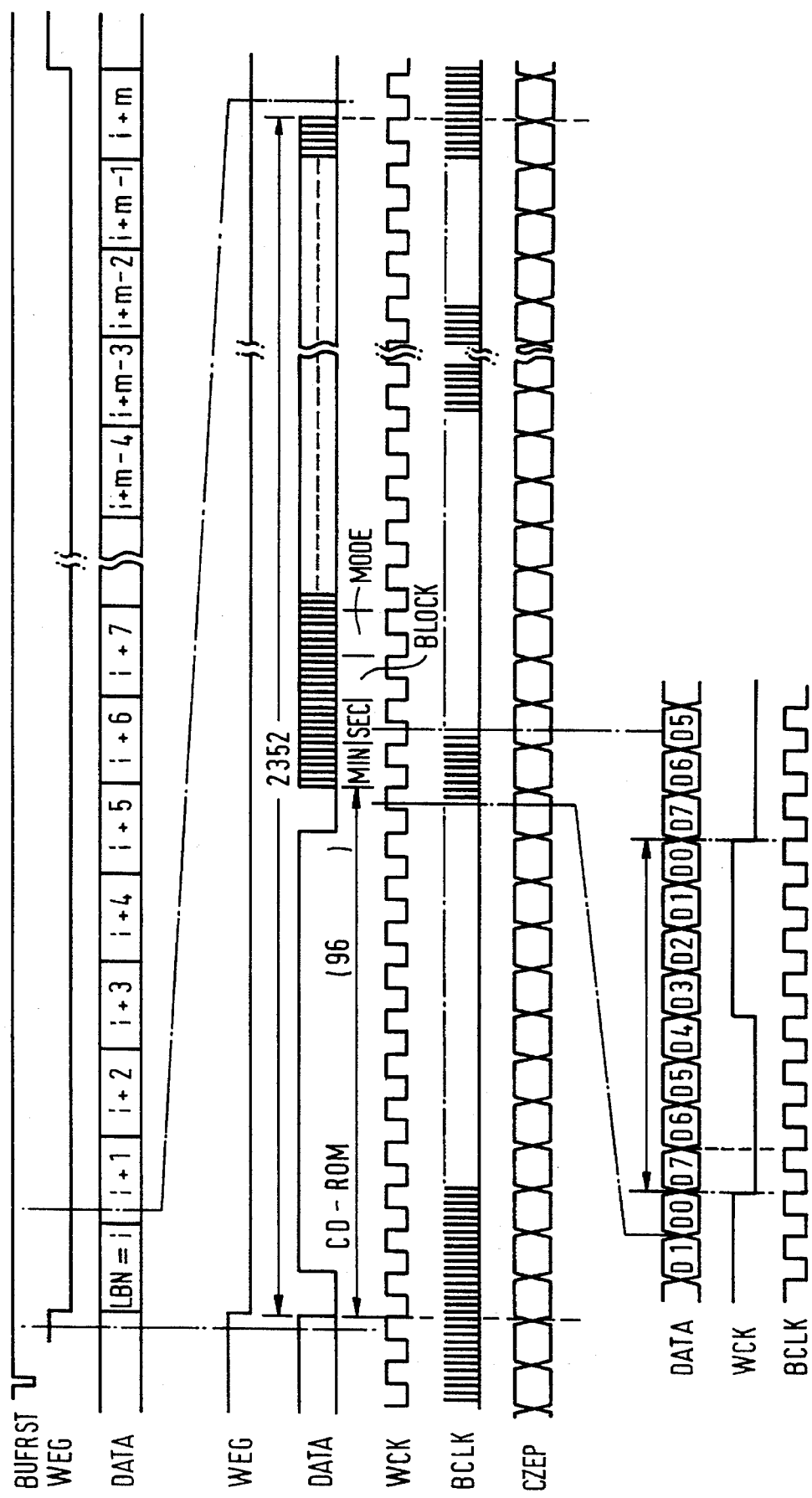
FIG. 13 provides a timing chart diagram for explaining the action of the block diagram of the signal processing unit.

FIG. 13 represents the transfering format of the CD-ROM data from the processing block 38a to the buffer memory 20a. Each data processing system read out the data within each sector. The serial transfering form was adapted for simplification. In the case of transfering audio data, a starting trigger signal for transfering is generated the data if the objective subcode address is detected. After outputing the standing-up point of subcode synchronizing signal and N audio sampling clock signal, transfering L channel audio data is started and after transfering number of data frame indicated, transfering is stopped before next L channel data transfering starts.

Figure 14:
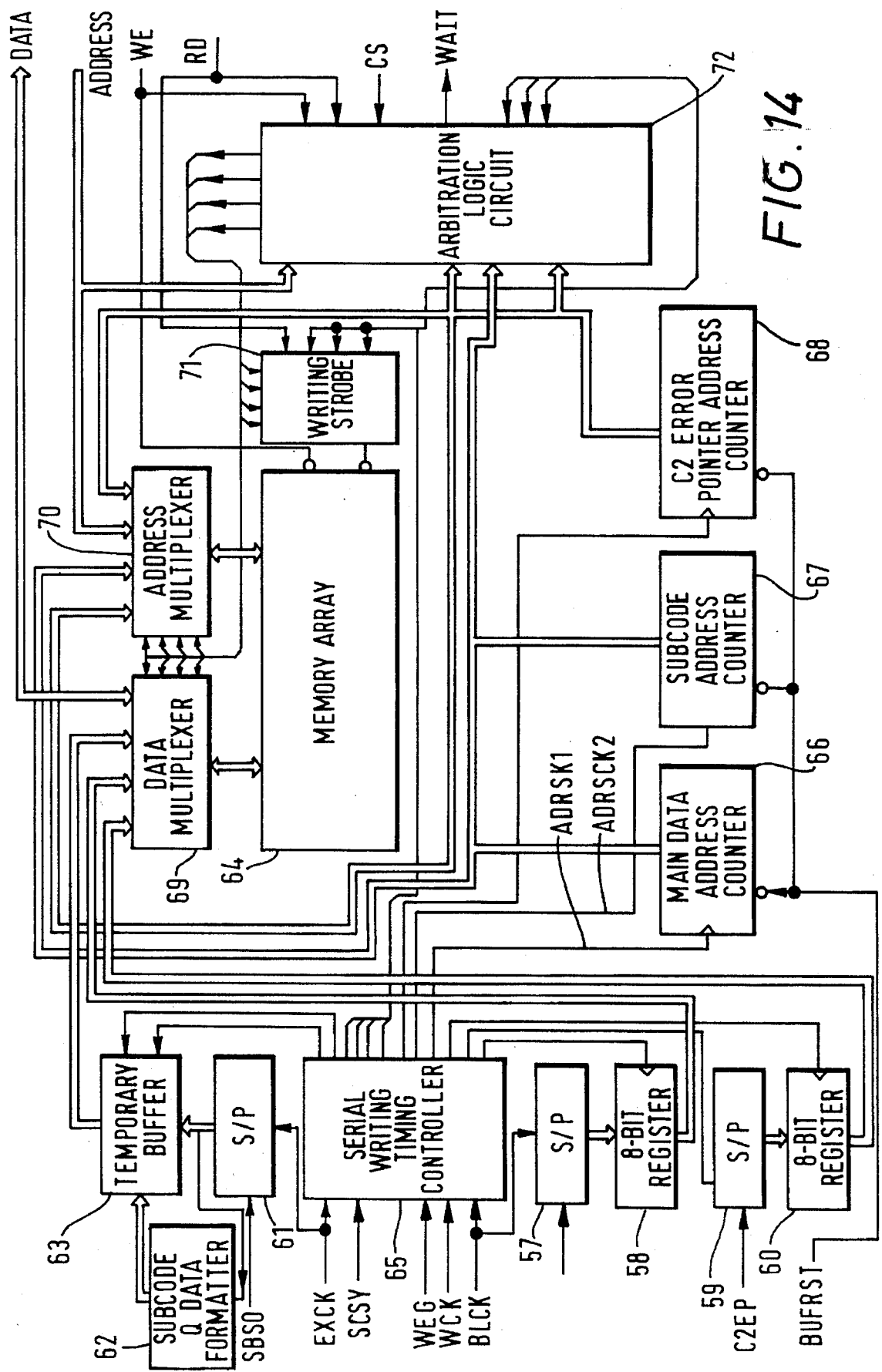
FIG. 14 provides a block diagram for explaining the buffer memory in detail.

FIG. 14 represents the composition of the buffer memory 20a in detail. The composition of the other buffer memories 20b–20h is the same as the composition of the buffer memory 20a. Therefore, an explanation for the other buffer memory 20b–20h is omitted. The buffer memory 20a stores the audio data which is transfered from the signal processing block 38a–38h, the CD-ROM data(comprising the syncronizing pattern) C2 error pointer data C2EP, and subcode data. The buffer memory 20a is composed of S/P(serial/parallel) converter 57 which converts the audio data/the CD-ROM data in serial form to 8 bit/word data, the 8 bit register 58 which latches the output of the S/P converter 57, S/P converter 59 which converts C2 error pointer data C2EP to 8 bit/word data, 8 bit register 60 which latches the output from the S/P converter 59, S/P converter 61 which converts subcode data P-W to 8 bit parallel data, subcode data formatter 62 which converts the subcode data abstracting from the output of the S/P converter 61 to parallel data, temporary buffer 63 which stores the subcode data P-W palallelized by the S/P converter 61 and the data formatter 62 storing one subcode frame period, serial writing timing controller 65 which controls data writing for memory array 64, main data writing address counter 66 which counts up address clock signal ADRSCK1 output from the serial writing timing controller 65, subcode writing address counter 67 which is counted up by address clock signal ADRSCK2 output from the serial writing timing controller 65, C2 error pointer data writing address counter 68 which counts up address clock signals ADRSCK3 output from the serial writing timing controller 65, data multiplier 69 which connects 3 systems of writing data base and 1 system of reading/writing data base with memory array 64 by switching, an address multiplier 70 which selectively connects out of the 3 systems of writing address base and 1 reading/writing address base to memory array 64, a writing strobe signal multiplier 71 which transfers 4 system of writing strobe signal to memory array 64, and an arbitlation logic circuit 72 which arbitlates accessing to either the group of the signal processing blocks 38a–38h or memory control circuit 21.

The audio data/CD-ROM data, the C2 error pointer C2EP and subcode data are written in the data area of the memory array 64 independently. The writing process for the audio data/the CD-ROM data is operated continualy. The C2 error pointer C2EP is written in the indicated data area of memory array 64 at writing cycles allocated by the arbitration logic circuit 72. After that 1 byte data is latched by the 8 bit register 60 and the access requirement for memory array 64 is generated and the audio data/the CD-ROM data is written in the buffer memory. The subcode data is written in the data area indicated of memory array 64. After that 106 byte of the data which is contained in the 1 subcode frame is written in the temporary buffer 63 and the access requirement for memory array 64 is generated and writing cycle of the subcode data is allocated opening period of writing of the audio data/CD-ROM data. During the writing of the subcode data, the next subcode data is written in the temporary buffer 63. Transfering of the subcode data between the temporary buffer 63 and the memory array 64 is finished while 1/20 period of subcode data.

The writing address counters 66,67,68 are cleared by an output of BUFRST signal which is output from the signal proccessing block 38a–38h and is counted up 1 by the address clock signal ADRSCK1, ADRSCK2, ADRSCK3 every finish of 1 byte data writing for memory array 64. The address clock signal ADRSCK1, ADRSCK2, ADRSCK3 are output from the system controller 65. When the writng of the audio data/CD-ROM data is failued by tracking jump and the data is read out again. The writing address counters 66,67,68 are cleared by BUFRST signal again.

The capacity of the buffer memory 20a corresponds to all of the data stored on the CD-ROM disc 11 which is read by moving the lens of each optical pickup device. The capacity of each buffer memory 20a–20h are different one from another. The capacity of the buffer memory 20a which stores the data obtained from the optical pickup device #1–#8 which are placed at the inner circumference of the CD-ROM disc 11 is allocated to be about 14 Mbyte and the capacity of the buffer memory 20h at the optical pickup device #39,#40 are allocated to be about 32 Mbyte.

Figure 15:
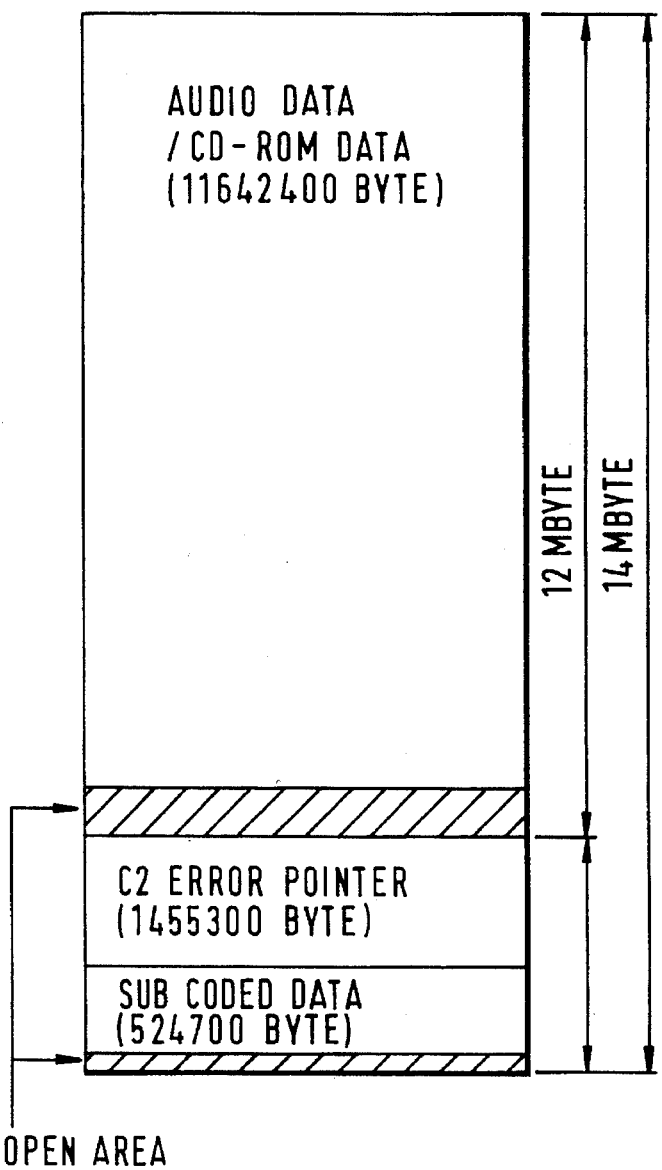
FIG. 15 provides an allocation of the data area of the buffer memory.

FIG. 15 represents allocation of the data area which stores audio data/CD-ROM data, C2 error pointer C2EP and subcode data in the buffer memory. The data area is able to store 4950 sectors of the data from the sector address 00:00:00. The data is written in area AREAi(i is 1 to 40) which stores the data obtained from each optical pickup device #1–#40 by detecting writing start address of area AREAi+1 and writing the sector data of the start address of area AREAi+1 as the last sector data. Data transfering from the signal proccessing block 38a–38h are finished when WEG signal is "H" level. In the case of area AREA39, writing the last sector address computed from TOC data is finished and data transfering finished.

The buffer memory 20a which finished the data transfering is able to access the data by the memory control circuit 21. The arbitration logic circuit 72 observes writing address read-out address and writen-in address of memory control circuit 21. If the arbitration logic circuit 72 detects data access from the memory control circuit 21 while writing the data from the signal processing block 38a–38h, the arbitration logic circuit 72 writes the data from the signal processing and the WAIT signal is activating and memory control circuit 21 waits for the access. The writing cycle of the signal processing block 38a–38h is waiting for the requirement of writing. The arbitration logic circuit 72 changes the WAIT signal to inactivate, and recieves data access from the memory control circuit 21. Usually, after the data reading of system is finished, the memory control circuit 21 accesses the data of the buffer memory 20a–20h.

Figure 16:
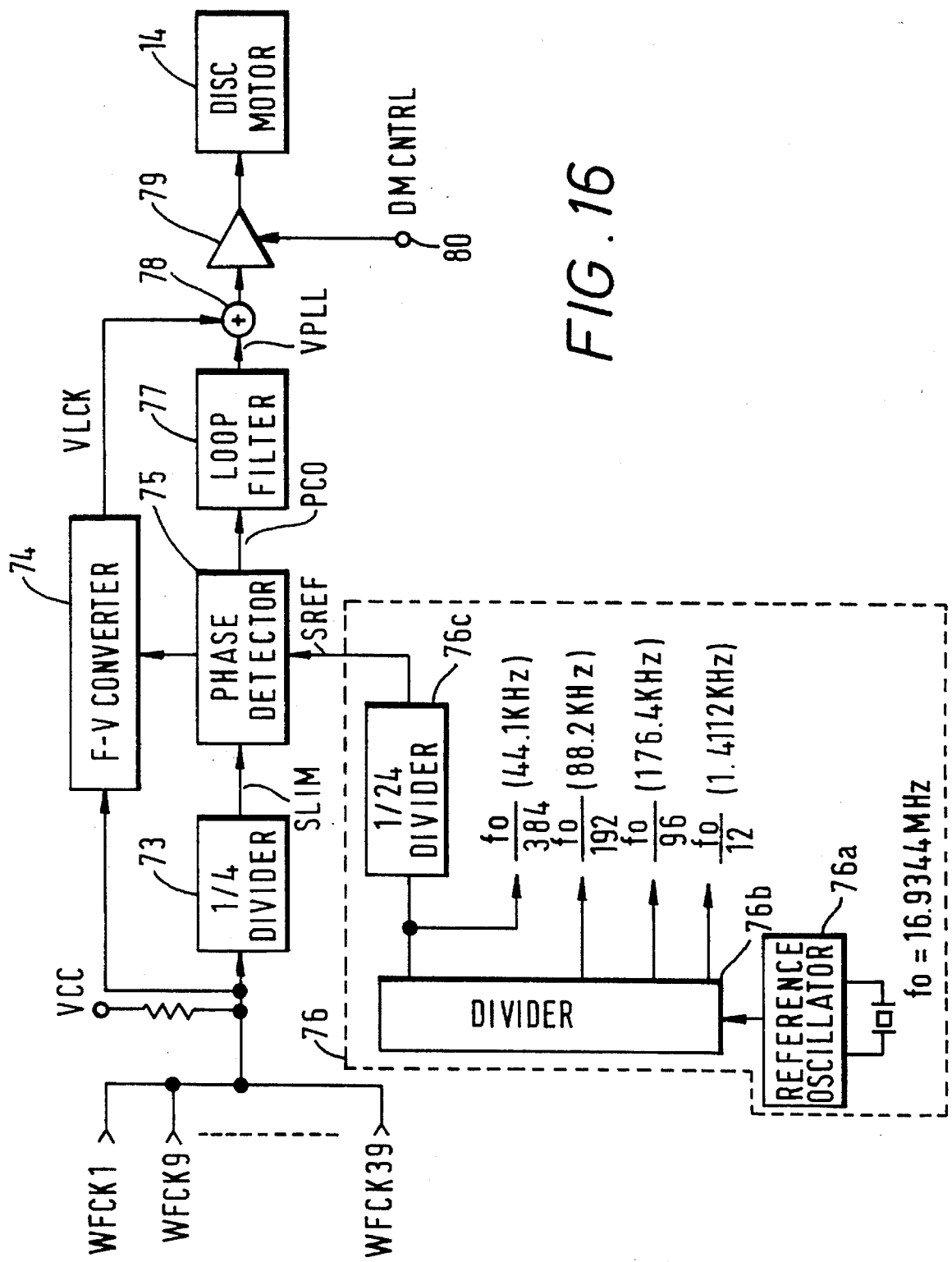
FIG. 16 provides a block diagram of the disc motor control circuit for controlling the disc motor.

FIG. 16 represents the disc motor controlling circuit 15 in detail. The disc motor controlling signal output from each proccesor block 16a–16h(EFM frame synchronizing signal WFCKi(i=1,9,16,22,27,32,36,39)) is supplied for ¼ divider 73 and the F-V (Frequency-Voltage) converter 74. The F-V converter 74 converts the disc mortor control signal WFCKi with frequency modulation to a DC voltage VLCK. (WFCKi/4) signal SLIM which is divided ¼ by divider 73 is supplied to an input terminal of phase detector 75. The reference clock signal SREF is generated by system clock signal generating circuit 76 which is composed of reference oscillater 76a, divider 76b, and 1/24 divider 76c.

Figure 18:
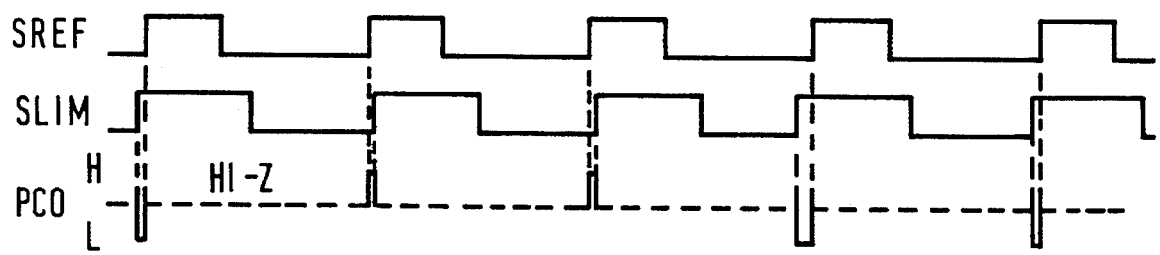
FIG. 18 provides a timing chart diagram for explaining the action of the phase comparing circuit.
Figure 17:
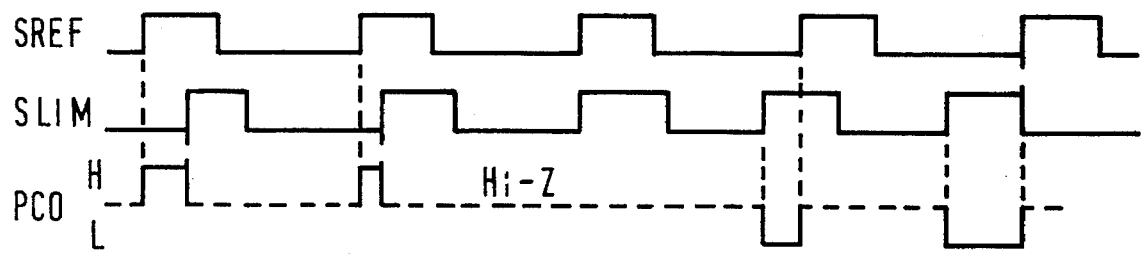
FIG. 17 provides a timing chart diagram for explaining the action of phase comparing circuit of the disc motor control circuit.

The phase detector 75 compares the phase of (WFCKi/4) signal SLIM and the phase of the reference clock signal SREF and outputs the comparison result to loop filter 77. In FIG. 17 and FIG. 18, the phase detector 75 compares the standing point of (WFCKi/4) signal SLIM and the standing point of the reference clock signal SREF and generates the phase comparing output PCO,H level, L level, and Hi-Z(inpeadance) corresponding to phase defference of the reference clock signal SREF. The phase comparing output PCO is converted to a DC voltage by the loop filter 77, added with the output of the F-V converter 74, supplied to the driving motor through the driving circuit 79. The driving circuit 79 is controlled corresponding to control signal DMCNTRL.

Figure 19:
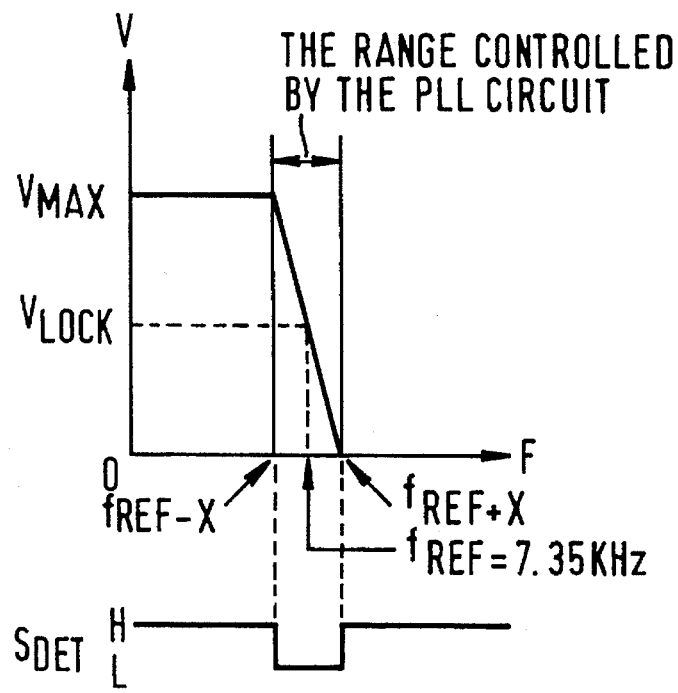
FIG. 19 provides a characteristic diagram of an F-V converting circuit.

If the rotation of the disc motor 14 syncronizes the reference clock signal SREF, the phase comparing output PCO of the phase detector 75 is Hi-Z and a constant DC voltage VPLL is output from the loop filter 77. Until the rotation speed of the disc motor 14 reaches to the range of plus/minus X % of the provisional rotation speed, the frequency servo which is controlled by the output from the F-V converter 74 operates and the F-V converter 74 apply the voltage to the disc motor 14. The characteristic of the F-V converter 74 is indicated in FIG. 19. The phase comparing output PCO is controlled by the window signal SDET which is output from the F-V converter 74. If the rotation speed of the disc motor 14 is in the range of plus/minus X % of provisional rotation, the window signal SDET is L level and the phase comparing output PCO is enable state. If the rotation of the disc motor 14 is out of the range during plus/minus X % of provisional rotation, the window signal SDET is H level and compulsively, the phase comparing output PCO is Hi-Z state.

The frequency range which corresponds to the window signal SDET is set rocking frequency range of the phase control loop. It usually set in the range that X eqauls to 5. If the linear velocity of the CD-ROM disc 11 is in the range of plus/minus 5% of provisional velocity, the phase control loop is activated. The phase control loop begins to synchronize (WFCKi/4) signal SLIM to the reference clock signal SREF. In the synchronizing state, both of the input frequencies of the phase detector 75 equals to 7.35/4 KHz, and the phase difference of the input signals is eqauls to 0. The output voltage of the F-V converter 74 keeps constant voltage Vlock.

Figure 20:
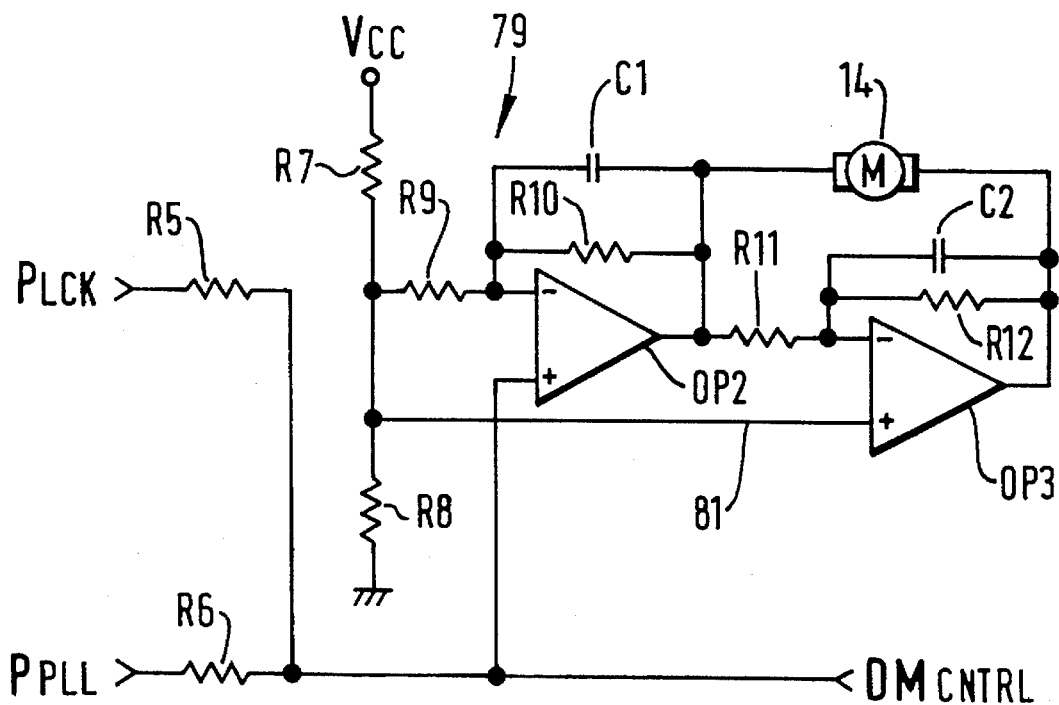
FIG. 20 provides a block diagram of the driving circuit of the disc motor control circuit.

If the rotation phase is varied by the load which is applied to the disc motor 14, a phase error pulse corresponding to phase difference of the reference clock signal SREF is output from the phase detector 75. The phase error pulse is integrated by the loop filter 77 and generates DC voltage VPLL. This voltage is supplied to the driving circuit 79. The driving circuit 79, in FIG. 20, is composed of operation amplifiers OP2, OP3, resisters R5–R12, and capacitors C1,C2, the output VLOCK of the F-V converter 74 is added the output VPLL of loop filter 77 through the register R5,R6, supplied to non inverting input terminal of the operation amplifier OP2 in the motor driving amplifier 81. If the phase of (WFCKi/4) signal SLIM is later than phase of the reference clock signal SREF, phase detector 75 outputs a "H" level pulse corresponding to the characteristic which is indicated in FIG. 17 and FIG. 18. If the pulse is converted to a DC-voltage by the loop filter 77, the voltage which is input through the non inverting input terminal of the operation amplifier OP2 corresponds to the voltage which is higher than the voltage corresponding to usual disc roatation. The power which varies to oppoists varing of the load applied the disc motor 14 is supplied to the disc motor 14. The power which is supplied to the disc motor 14 vary to complement the phase difference between the (WFCKi/4) signal SLIM and the reference clock signal SREF is to be zero.

If the phase of (WFCKi/4) signal SLIM is faster than phase of the reference clock signal SREF, the power which is supplied to the disc motor 14 is limited and is reduced for that the phase difference between (WFCKi/4) signal SLIM and the reference clock signal SREF is 0. The phase detector 75 applied row of the "L" level pulse. The error correction is operated again and again, therefore, the linea velocity of the CD-ROM disc is controlled to be constant by the crystal precision control.

The control for the linear velocity of the CD-ROM disc 11 is controlled for that the optical pickup device #1 is able to read the 512 tracks of the data stored on the CD-ROM disc 11 by the scanning of the optical pickup device #1. (The 512 tracs of the data is stored in the inner circumference part which is 25 mm–25.82 mm from the center O in a radius of the CD-ROM disc 11.) If the optical pickup device #1 read out the TOC data, the optical pickup device #1 is controlled to move 1.5 mm from the part in the innner circumference. Then, the signal proccessing block 38a process the data at the clock frequency(4.3218 MHz) which corresponds to the linear velocity formulated by the CD-ROM format. If proccessor blocks 16a–16h proccess the data which read by the other optical pickup device #2–#40, the clock frequency of the proccessor blocks 16a–16h depends on the rotation of the disc motor 14 when the optical pickup device read out the data stored on the most inner circumference and the radius which stores the data read by the optical pickup device #2–#40.

If the optical pickup device #1 scans the data area which is located between 25 mm and 25.2 mm from the center O of the CD-ROM disc 11 and the linear velocity V of the roatating CD-ROM disc 11 is 1.3 mm / sec, the rotation N of the disc mortor 14 varies and is indicated as below.

| N (rps) | the radius (mm) from the center O |
|---|---|
| 8.72 rps | 25 mm |
| 8.01 rps | 25.82 mm |

If the optical pickup device #2 scans the 512 tracks of the data which is located between 25.8 mm and 26.62 mm from the center O of the CD-ROM disc 11, the linea velocity of the beamspot of the optical pickup device #2 is calculated and indicated as below.

| V (m/s) | the radius (mm) from the center O |
|---|---|
| 1.340 m/s | 25.8 mm |
| 1.339 m/s | 26.62 mm |

If the optical pickup device #40 scans the data area which is located between 57 mm and 57.82 mm from the center O of the CD-ROM disc 11, the linea velocity of the beamspot of the optical pickup device #40 varies and and indicated as below.

| V (m/s) | the radius (mm) from the center O |
|---|---|
| 2.962 m/s | 57 mm |
| 2.910 m/s | 57.82 mm |

The linear velocity of the beamspot which scans the data area of the most inner circumference side is faster than the linear velocity of the beamspot which scans the data area of the most outer circumference side. The linear velocity of the beamspot varies in 2%. The frequency area of the synchronizing clock signal which is output from the EFM-PLL circuit 41 is set in consideration of the deviation of the linear velocity at the data storing of the CD-ROM disc 11. The CLV servo means functions after that the data stored on the CD-ROM disc 11 is started to read by the optical pickup device #1. Until that focus servo of the optical pickup device #1 functioned and the EFM data is read out, the disc motor 14 is controlled in the rough servo mode by the system controller 17. Then, the system controller 17 outputs the control signal DMCNTRL and the disc motor 14 is rotated at the about 1.2 m/s–1.4 m/s by the driving voltage generated from the control signal.

In the example, 40 optical pickup are devided 8 groups. Each group comprises 8,7,6,5,5,4,3 and 2 optical pickup devices. The number of the optical pickup devices located at the outter circumference side of the CD-ROM 11 which is comprised in each proccessor blocks are more than the number of the optical pickup devices located at the outter circumference side of the CD-ROM 11 which is comprised in each proccessor blocks. If the system controller 17 has the extra ability to control the optical pickup device, The system controller 17 is able to control the optical pickup device #1–#40 directly and the data obtained from each signal proccessor blocks each buffer memory is written in the buffer memories correspondig to the proccessor block.

As described above, the present invention can provides an extremely preferable disc reproducing apparatus.

While there have been illustrated and described what at present considered to be prefered embodiments of the present invention, it will be understood by those skilled in the art that various changes and modifications may be made, and equivalents may be substituted for elements therof without departing from the true scope of present invention. In addition, many modifications may be made to adapt particular situstion or material to the teaching of the present invention not be limited to the particular emboodiment disclosed as the best mode contemplated for carrying out the present invention, but that the present invention include all embodiments falling within the scope of the appended claims.

What is claimed is:

1. An apparatus for reproducing data stored in a constant linear velocity format within a data area on a disc, comprising:

rotating means for rotating the disc about an axis of rotation thereof;

data processing means having a plurality of optical pickup devices, fixed with respect to each other and the axis of rotation of the rotating means, for reading the data from the rotating disc, each optical pickup device comprising a movable lens which moves to read the data from different sections of the data area; and control means for controlling the revolution of the rotating disc in accordance with a position of a beam spot created by at least one of the movable lens.

2. An apparatus as in claim 1, wherein each of the optical pickup devices are positioned so that all the data on the disc may be read by the movable lenses.

3. An apparatus as in claim 1, wherein each of the movable lenses directs a beam onto the disc and each of the optical pickup devices comprises lens control means for moving a corresponding said movable lens to shift the position of its corresponding said beam on the disc.

4. An apparatus as in claim 3, wherein each of the movable lenses shifts its corresponding said beam approximately the same distance.

5. An apparatus as in claim 2, wherein each of the movable lenses directs a beam onto the disc and each of the optical pickup devices comprises lens control means for moving a corresponding said movable lens to shift the position of its corresponding said beam on the disc.

6. An apparatus as in claim 5, wherein each of the movable lenses shifts its corresponding said beam approximately the same distance.

7. An apparatus for reproducing data stored in a constant linear velocity format within a data area on a disc, comprising:

rotating means for rotating the disc about an axis of rotation thereof;

a plurality of optical pickup devices, fixed with respect to each other and the axis of rotation of the rotating means, for reading the data from the rotating disc, each optical pickup device comprising a movable lens, the movable lenses simultaneously read the data from different parts of the data area on the disc;

a plurality of processing units for processing the data read by each of the optical pickup devices;

data storing means having a plurality of storage areas corresponding to the processing units for storing the data processed by the plurality of processing units; and control means for reading the data stored in the storage areas and transmitting the data in response to an access requirement.

8. An apparatus for reproducing digital data stored in a constant linear velocity format within a data area on a disc, the digital data being composed of a series of data blocks which have corresponding address data to identify each said data block, comprising:

rotating means for rotating the disc about an axis of rotation thereof;

a plurality of optical pickup devices, fixed with respect to each other and the axis of rotation of the rotating means, for reading the data from the rotating disc, each pickup device comprising a movable lens which moves to read the data from a different part of the data area on the disc;

first control means for controlling the rotating means to rotate the disc at a first speed corresponding to one of the optical pickup devices, and controlling the optical pickup devices to simultaneously begin to read out the data during a first reproduction mode;

data processing means having a plurality of processing units for processing the data read by each of the optical pickup devices and outputting processed data corresponding to the data;

first storing means having a plurality of storage areas, each corresponding to each said data block identified by the corresponding address data, for storing the processed data, composed of said data blocks, output by each of the processing units in the first reproduction mode;

second storing means for storing flag data for identifying the storage areas of the first storing means and indicating which of said each data block was stored in a corresponding one of the storage areas;

detecting means for inspecting the flag data to detect absence of the data stored in the storage areas of the first storing means; and second control means acting in response to the detecting means for controlling the rotating means to rotate the disc at a second speed corresponding to a selected one of the optical pickup devices which is to read out missing data determined by inspecting the flag data, the second control means causing the selected optical pickup device to read out the missing data in a second reproduction mode.

\* \* \* \* \*